US012801284B2

(12) United States Patent
Harboe et al.

(10) Patent No.: US 12,801,284 B2
(45) Date of Patent: Nov. 17, 2026

(54) GLOBAL MEMORY DISAMBIGUATION FOR A PARALLEL ARCHITECTURE WITH COMPUTE SLICES

(71) Applicant: Ascenium, Inc., Mountain View, CA (US)

(72) Inventors: Øyvind Harboe, Stavanger (NO); Jacob John Vorland Taylor, Oslo (NO); Anders Schau Knatten, Oslo (NO)

(73) Assignee: Ascenium, Inc., Mountain View, CA (US)

( * ) Notice: Subject to any disclaimer, the term of this patent is extended or adjusted under 35 U.S.C. 154(b) by 0 days.

(21) Appl. No.: 19/197,924

(22) Filed: May 2, 2025

(65) Prior Publication Data

US 2025/0341970 A1 Nov. 6, 2025

Related U.S. Application Data

(60) Provisional application No. 63/744,394, filed on Jan. 13, 2025, provisional application No. 63/659,401, (Continued)

(51) Int. Cl.
*G06F 3/06* (2006.01)

(52) U.S. Cl.
CPC .......... *G06F 3/0613* (2013.01); *G06F 3/0659* (2013.01); *G06F 3/067* (2013.01)

(58) Field of Classification Search
CPC .......... G06F 3/06; G06F 3/0613; G06F 3/067; G06F 3/0659; G06F 3/0679; G06F 3/0661; G06F 3/0656
See application file for complete search history.

(56) References Cited

U.S. PATENT DOCUMENTS 7,600,221 B1 10/2009 Rangachari
7,840,777 B2 11/2010 Mykland
(Continued)

OTHER PUBLICATIONS

A. Szegedi and T. Gyimothy, "Dynamic slicing of Java bytecode programs," Fifth IEEE International Workshop on Source Code Analysis and Manipulation (SCAM'05), Budapest, Hungary, 2005, pp. 35-44. (Year: 2005).*

(Continued)

*Primary Examiner* — Pierre Michel Bataille
(74) *Attorney, Agent, or Firm* — Adams Intellex, PLC

(57) ABSTRACT

Techniques for checking memory operations are disclosed. A processing unit is accessed, comprising compute slices, control unit, local memory disambiguation units (LMDUs), and a global MDU (GMDU). Each slice includes an execution unit and is coupled to successor and predecessor slices. Each slice is coupled to an LMDU. Each LMDU is coupled to the GMDU. A first slice executes a first slice task. The task includes a load instruction and address. The slice issues the load to an LMDU, saving load information in a memory operation table (MOT). For a not fully serviced load instruction, the LMDU sends the load information to the GMDU, storing load information in a global MOT (GMOT). The GMOT detects address aliasing between the load address and a previously issued address saved in the GMOT. The GMOT forwards memory information from previously issued memory instructions to the MOT to satisfy the load instruction.

24 Claims, 13 Drawing Sheets

Related U.S. Application Data filed on Jun. 13, 2024, provisional application No. 63/642,391, filed on May 3, 2024.

(56) References Cited

U.S. PATENT DOCUMENTS

| | | | | |
|---|---|---|---|---|
| 8,255,913 | B2 * | 8/2012 | Arimilli | G06F 9/542 718/103 |
| 8,677,081 | B1 | 3/2014 | Wentzlaff et al. | |
| 8,949,806 | B1 | 2/2015 | Lee et al. | |
| 9,304,770 | B2 | 4/2016 | Mykland | |
| 9,582,277 | B2 | 2/2017 | Muff et al. | |
| 9,971,605 | B2 | 5/2018 | Henry et al. | |
| 10,089,277 | B2 | 10/2018 | Mykland | |
| 10,338,927 | B2 | 7/2019 | Khartikov et al. | |
| 10,936,008 | B2 * | 3/2021 | Knowles | G06F 9/4881 |
| 11,567,555 | B2 * | 1/2023 | Kim | G06F 1/12 |
| 12,154,025 | B1 * | 11/2024 | Savic | G06F 3/0659 |
| 2015/0100765 | A1 | 4/2015 | Abdallah | |
| 2019/0250852 | A1 * | 8/2019 | Kabra | G06F 3/067 |
| 2019/0294571 | A1 * | 9/2019 | Carlough | G06F 13/36 |
| 2020/0241879 | A1 | 7/2020 | Vorbach et al. | |
| 2021/0303311 | A1 | 9/2021 | Fatehi et al. | |
| 2021/0334026 | A1 * | 10/2021 | Yu | G06F 3/0673 |
| 2022/0012061 | A1 * | 1/2022 | Pallister | G06F 11/2236 |
| 2025/0021405 | A1 * | 1/2025 | Bastiansen | G06F 9/522 |

OTHER PUBLICATIONS

T. N. Vijaykumar and G. S. Sohi, “Task selection for a multiscalar processor,” Proceedings. 31st Annual ACM/IEEE International Symposium on Microarchitecture, Dallas, TX, USA, 1998, pp. 81-92. (Year: 1998).*

* cited by examiner

700

GLOBAL MEMORY OPERATION TABLE 710

720

722

| ADDR INFO | | | STORE INFO | | | | | | LOAD INFO | | | | | | |
|---|---|---|---|---|---|---|---|---|---|---|---|---|---|---|---|
| ADDR | PNG LD | PNG LD_ DATA | S0 ST_ DATA | S0 ST_ MASK | S0 ST_ VALID | S0 ST_ ISSUE | ST_ ••• | ... | S0_ ••• | S1 LD_ DATA | S1 LD_V_ MASK | S1_ LD_ VALID | S1 LD_ INT | S1 LD_ SVCD | ... |
| 0xABCD | 0b0 | 0b0 | 0x1234 | 0x01 | 0b1 | 0b0 | | ... | | | | | | | ... |
| 0xABCE | 0b0 | 0b0 | 0xFFFF | 0x03 | 0b1 | 0b0 | | ... | | | | | | | ... |

•••

FIG. 7

900

GLOBAL MEMORY OPERATION TABLE 910

| ADDR INFO | | | STORE INFO | | | | | | LOAD INFO | | | | | | |
|---|---|---|---|---|---|---|---|---|---|---|---|---|---|---|---|
| ADDR | PNG LD | PNG LD_DATA | S0 ST_DATA | S0 ST_MASK | S0 ST_VALID | S0 ST_ISSUE | ST_ ... | ... | S0_ ... | S1 LD_DATA | S1 LD_V_MASK | S1_ LD_ VALID | S1 LD_ INT | S1 LD_ SVCD | ... |
| 0xABCD | 0b0 | 0b0 | 0x1234 | 0x01 | 0b1 | 0b0 | | ... | 0b0 | | | | | | ... |
| 0xABCE | 0b1 | 0b1 | 0xFFFF | 0x03 | 0b1 | 0b0 | | ... | 0b0 | 0xFFFF | 0x03 | 0b1 | 0xFF | 0b0 | ... |

...

920

922

FIG. 9

1000

GLOBAL MEMORY OPERATION TABLE 1010

1020 1030

| ADDR INFO | | | STORE INFO | | | | | | LOAD INFO | | | | | | |
|---|---|---|---|---|---|---|---|---|---|---|---|---|---|---|---|
| ADDR | PNG LD | PNG LD_ DATA | S0 ST_ DATA | S0 ST_ MASK | S0 ST_ VALID | S0 ST_ ISSUE | ST_ ••• | ... | S0_ ••• | S1 LD_ DATA | S1 LD_V_ MASK | S1_ LD_ VALID | S1 LD_ INT | S1 LD_ SVCD | ... |
| 0xABCD | 0b0 | 0b0 | 0x1234 | 0x01 | 0b1 | 0b0 | | ... | 0b0 | | | | | | ... |
| 0xABCE | 0b1 | 0b0 | 0xFFFF | 0x03 | 0b1 | 0b0 | | ... | 0b0 | 0xA11F | 0x03 | 0b1 | 0xFF | 0b0 | ... |

1022

•••

*FIG. 10*

1100

GLOBAL MEMORY OPERATION TABLE 1110

1120

| ADDR INFO | | | STORE INFO | | | | | | LOAD INFO | | | | | | |
|---|---|---|---|---|---|---|---|---|---|---|---|---|---|---|---|
| ADDR | PNG LD | PNG LD_ DATA | S0 ST_ DATA | S0 ST_ MASK | S0 ST_ VALID | S0 ST_ ISSUE | ST_ ••• | ... | S0_ ••• | S1 LD_ DATA | S1 LD_V_ MASK | S1_ LD_ VALID | S1 LD_ INT | S1 LD_ SVCD | ... |
| 0xABCD | 0b0 | 0b0 | 0x1234 | 0x01 | 0b1 | 0b0 | | ... | 0b0 | | | | | | ... |
| 0xABCE | 0b1 | 0b0 | 0xFFFF | 0x03 | 0b1 | 0b0 | | ... | 0b0 | 0xA11F | 0x03 | 0b1 | 0xFF | 0b1 | ... |

•••

FIG. 11

1200

GLOBAL MEMORY OPERATION TABLE 1210

| ADDR INFO | | | STORE INFO | | | | | | LOAD INFO | | | | | | |
|---|---|---|---|---|---|---|---|---|---|---|---|---|---|---|---|
| ADDR | PNG LD | PNG LD_ DATA | S0 ST_ DATA | S0 ST_ MASK | S0 ST_ VALID | S0 ST_ ISSUE | ST_ ••• | ... | S0_ ••• | S1 LD_ DATA | S1 LD_V_ MASK | S1_ LD_ VALID | S1 LD_ INT | S1 LD_ SVCD | ... |
| 0xABCD | 0b0 | 0b0 | 0x1234 | 0x01 | 0b1 | 0b0 | | ... | 0b0 | | | | | | ... |
| 0xABCE | 0b0 | 0b0 | 0xFFFF | 0x03 | 0b1 | 0b0 | | ... | 0b1 | 0xA11F | 0x03 | | 0xFF | 0b1 | ... |

•••

FIG. 12

GLOBAL MEMORY DISAMBIGUATION FOR A PARALLEL ARCHITECTURE WITH COMPUTE SLICES

RELATED APPLICATIONS

This application claims the benefit of U.S. provisional patent applications "Global Memory Disambiguation For A Parallel Architecture With Compute Slices" Ser. No. 63/642,391, filed May 3, 2024, "Memory Dependence Prediction In A Parallel Architecture With Compute Slices" Ser. No. 63/659,401, filed Jun. 13, 2024, and "Code Translation And Forwarding With Compute Slices" Ser. No. 63/744,394, filed Jan. 13, 2025.

Each of the foregoing applications is hereby incorporated by reference in its entirety.

FIELD OF ART

This application relates generally to checking memory operations and more particularly to global memory disambiguation for a parallel architecture with compute slices.

BACKGROUND

Significant advancements in computing technology have noticeably enhanced data processing for organizations including corporations, hospitals, schools, and individuals including researchers, data analysts, and many others. Significant advancements in each of these areas have enabled new theories, models, and applications. The advancements in turn spur increased demand for advanced computing technologies. That is, demand drives improvements in computing, which achieves greater processing objectives, which drives computing improvement demands. The computing infrastructures that are applied to processing tasks can be large and complex. These modern technologies formed from electronic logic gates are vastly different from the very earliest computers. Initially, the idea of using vacuum tubes as logic gates was established prior to 1920. However, computers based on electromechanical relays were built before the first successful vacuum tube computer, the ENIAC with its 18,000 vacuum tubes, requiring copious electricity, producing immense heat, and providing a then heady 450 floating point operations per second (FLOPS).

Computers slowly evolved and achieved a steady increase in processing power. The invention of the transistor in 1947 inaugurated a new generation of computers, enabling applications previously unachievable with vacuum-tube technology. Programming techniques advanced as compute power increased. Computer languages such as COBOL and FORTRAN were created to replace hard-to-use punch cards. These programming languages significantly increased the process of making compute resources accessible to engineers to solve everyday problems. In the late 1950s, the first integrated circuit (IC) was created, and with it, a new era in computer technology. From here, the rate and pace of technological change intensified, including the development of the first general purpose microprocessor, the DRAM chip, and the floppy drive. These devices enabled the first marketable personal computers.

Electronic processors are now found in a wide variety of electronic devices. Smartphones now have more than a million times the compute power of early computers. A standard personal computer today is roughly capable of tens of gigaFLOPs (1 billion floating point operations per second). Meanwhile, the world's fastest supercomputer is much more powerful, with more than eight million processor cores and a total compute power surpassing one exaFLOP (1 quintillion floating point operations per second). Predictably, this exponential increase in compute power has opened a world of new and powerful applications. Augmented reality, genomic sequencing, machine learning, artificial intelligence, cancer treatments, and autonomous vehicles are just a small sample of what has become possible with the power of today's high-performance processors and compute systems. In the future, human ingenuity will surely continue to push the technical boundaries of possibility as more processing power and new applications become available.

SUMMARY

Electrical and process engineers, material scientists, and others have for decades developed new architectures, circuit families, fabrication techniques, and materials that enable advances in computing. These advances in computing have enabled previously unobtainable data processing techniques, supported more complex simulations and models, and spawned computational fields such as artificial intelligence. The computational requirements of these advanced techniques, models, and fields have quickly overwhelmed existing computational capabilities, thereby spurring development of new architectures, circuits, and so on. The "arms race" between computational resource advances and computational requirements continues to this day. However, providing more capable resources has become increasingly difficult. Faster clock speeds have been implemented successfully to increase the processing capability, but faster speeds make designs more complex. Further, circuit power dissipation has severely limited the extent to which clock speeds can be pushed. As a result, the increase in processor clock rates has been limited because cooling technologies have not been able to keep pace with excessive heat dissipation of modern designs. Code execution parallelism has offered an additional method to increase performance. For example, a microprocessor chip can include any number of smaller processor cores, each able to perform operations in parallel. This approach, while common, has required engineers to devise methods to ensure that each core has access to read from and write to memory. The system must also be prevented from accessing "stale" data, by delivering the most up-to-date data to all processing elements when required. As more and more parallelism has been added to microprocessor chips, memory system design has become a significant challenge. To address the continued need for increased performance, global memory disambiguation for a parallel architecture with compute slices is disclosed.

Techniques for global memory disambiguation for a parallel architecture with compute slices are disclosed. A processing unit is accessed. The processing unit can be based on one or more integrated circuits or chips, application-specific chips, programmable chips, and so on. The processing unit includes various electronic elements that enhance the unit. The electronic elements include a plurality of compute slices, a control unit, a plurality of local memory disambiguation units (LMDUs), and a global memory disambiguation unit (GMDU). The electronic elements further include a memory system. Each compute slice within the plurality of compute slices includes at least one execution unit. Each compute unit is coupled to a successor compute slice and a predecessor compute slice. Each compute slice within the plurality of compute slices is coupled to a LMDU in the plurality of LMDUs. The LMDUs can be used to provide some or all data required by a memory access load operation. Each LMDU in the plurality of LMDUs is coupled to the GMDU. The GMDU can "look across" the plurality or LMDUs to provide some or all data required by a memory access load operation when the required data is not present in the LMDU coupled to its associated compute slice. A first compute slice in the plurality of compute slices executes a first slice task. The first slice task includes a load instruction, and the load instruction includes a load address. The control unit distributes the first slice task to the first compute slice. The slice task can include one or more instructions such as arithmetic, logic, and memory access instructions.

A processor-implemented method for checking memory operation is disclosed comprising: accessing a processing unit comprising a plurality of compute slices, a control unit, a plurality of local memory disambiguation units (LMDUs), and a global memory disambiguation unit (GMDU), wherein each compute slice within the plurality of compute slices includes at least one execution unit and is coupled to a successor compute slice and a predecessor compute slice, wherein each compute slice within the plurality of compute slices is coupled to an LMDU in the plurality of LMDUs, and wherein each LMDU in the plurality of LMDUs is coupled to the GMDU; executing, by a first compute slice in the plurality of compute slices, a first slice task, wherein the first slice task includes a load instruction, and wherein the load instruction includes a load address; issuing, by the first compute slice, the load instruction to a first LMDU within the first compute slice, wherein the issuing includes saving, in a memory operation table (MOT) within the first LMDU, load information associated with the load instruction; sending, by the first LMDU, the load information to the GMDU, wherein the load instruction was not fully serviced by the MOT, wherein the sending includes storing, in a global memory operation table (GMOT) within the GMDU, the load information; detecting, by the GMOT, address aliasing between the load address and an address of one or more previously issued memory instructions, wherein the address of the one or more previously issued memory instructions is saved in the GMOT; and forwarding, by the GMOT, to the MOT, memory information from the one or more previously issued memory instructions, wherein the memory information satisfies one or more bytes of data required for the load instruction. In embodiments, the saving includes checking, by the MOT, for an aliasing between the load address and a previously executed store instruction, wherein the aliasing is not detected. Some embodiments comprise coalescing, within the GMOT, one or more additional store instructions, wherein the one or more additional store instructions include a same store address, wherein the one or more additional store instructions are obtained from the first LMDU.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 7 is a first example of forwarding data with a GMOT.

FIG. 9 is a third example of forwarding data with a GMOT.

FIG. 10 is a fourth example of forwarding data with a GMOT.

FIG. 11 is a fifth example of forwarding data with a GMOT.

FIG. 12 is a sixth example of forwarding data with a GMOT.

DETAILED DESCRIPTION

Figure 1:
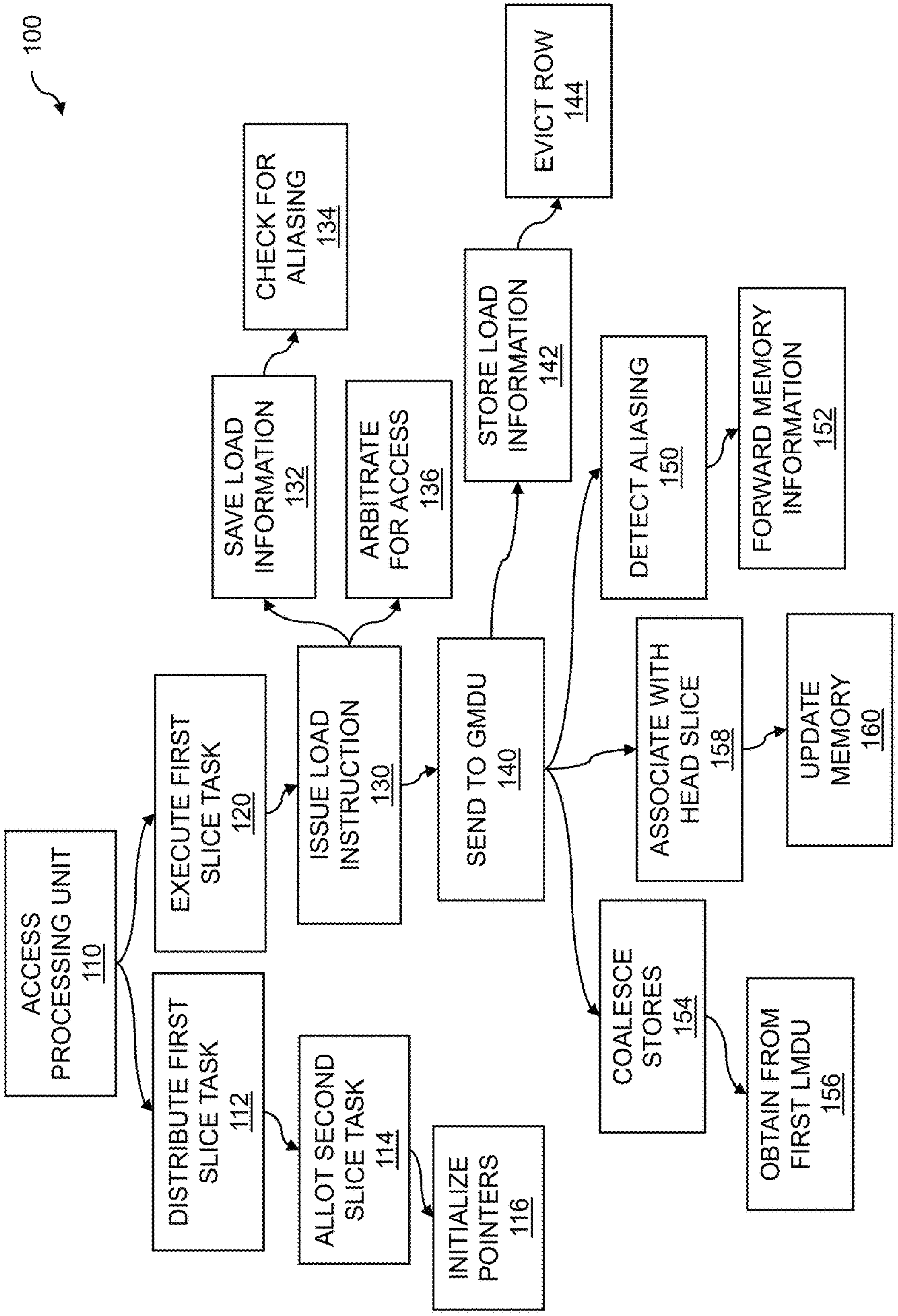
FIG. 1 is a flow diagram for global memory disambiguation for a parallel architecture with compute slices.

Modern computation objectives such as advanced modeling and simulation, artificial intelligence, deep learning, and so on are continuously driving the demand for greater compute power. The many computationally intensive applications are increasingly being applied even to day-to-day tasks. All organizations, including those with computationally complex needs and modest, "low-tech" organizations are faced with a nearly continuous upgrade of their compute resources specifically to remain competitive. Faster processor clock speeds have been successfully applied in the past to increase the processing capabilities of modern compute systems. However, there are performance limitations to merely increasing clock frequencies. Cooling technology has been woefully inadequate to meet demands of processor technologies resulting from improved lithography and increased clock frequencies, requiring other methods of performance improvements, such as parallelism, to be explored. Implementing parallelism can be accomplished by increasing the number of execution units on a processor, and/or adding multiple processor cores to the same chip. The parallelism enables threading within the processor. These design options increase overall performance by enabling the system to take advantage of more instruction level parallelism (ILP). That said, these approaches also come with significant cost and complexity, in part due to the "too many cooks" problem. For example, instructions and data must be able to move efficiently and concurrently in and out of multiple processor cores on the same chip so that the processors do not stall. Processor stalling can reduce or eliminate any performance enhancement that was achieved. Further, memory semantics must be maintained across all cores in the system so that the contents of memory do not become corrupted, and each core operates on the most recent data, even if updated by another core in the system. Thus, highly efficient memory system designs have become a key piece to increase processor performance.

To address the continued need for increased performance, a parallel architecture with compute slices and global memory disambiguation is disclosed. A compiled program is divided into slice tasks. Slice tasks comprise code sequences of various sizes which include at least one load instruction. A control unit within a processing unit can allocate any number of slice tasks to compute slices. The allocation is based on one slice task at a time per compute slice. The control unit can allocate a first slice task, which can be a predecessor task, which can run non-speculatively. In some embodiments, all other successive slice tasks run speculatively. The control unit can allocate a first slice task to a first compute slice pointed to by a pointer such as a head pointer. The first compute slice can execute the first slice task. The first slice task includes a load instruction. The load instruction includes a load address from which the load data is to be obtained. The first compute slice issues the load instruction to a first local memory disambiguation unit (LMDU). Load information associated with the load instruction is saved in a memory operation table (MOT) within the LMDU. The first LMDU sends the load information to the GMDU, where the load instruction was not fully serviced by the MOT. The sending includes storing, in a global memory operation table (GMOT) within the GMDU, the load information. Load information such as the load address is checked against other addresses in the GMOT. Address aliasing between the load address and an address of one or more previously issued memory instructions is detected. The detecting is accomplished by the GMOT. The GMOT forwards memory information from the one or more previously issued memory instructions. The memory information satisfies one or more bytes of data required for the load instruction.

Each compute slice is coupled to a successor compute slice and a predecessor compute slice by a barrier register set. The coupling can result in a ring configuration. The coupling of the compute slices enables data communication between compute slices. For example, a current compute slice can be coupled to an immediately succeeding compute slice by a current barrier register set. The current barrier register set provides unidirectional communication from the current compute slice to the successor compute slice. Thus, the first compute slice can write to the first barrier register set and the successor compute slice can read from the first barrier register set. Pointers are used to determine how slice tasks are assigned and controlled by the control unit. The pointers can be part of the internal control unit state. The pointers can include a head pointer and a tail pointer. Embodiments include initializing pointers, wherein a head pointer points to the first compute slice, and wherein a tail pointer points to the second compute slice. The tail pointer can point to a subsequent compute slice in the plurality of compute slices. The pointers can point to a slice task that is executing speculatively and a slice task that is executing non-speculatively. In embodiments, the head pointer points to a slice task that is running non-speculatively. The compute slice that is executing non-speculatively is known to be part of the executed program. In embodiments, the tail pointer indicates which compute slice was the last to receive a slice task by the control unit. A head slice can be a compute slice which is pointed to by the head pointer. Likewise, a tail slice can be a compute slice pointed to by a tail pointer. In embodiments, a compute slice can execute speculatively if it is not the head slice. In other embodiments, the control unit distributes a slice task to a compute slice succeeding the tail slice. After distribution, the control unit can update the tail slice to point to the succeeding compute slice for further distribution of slice tasks to downstream compute slices. The head pointer and the tail pointer can be updated, by the control unit, based on slice task execution status, branch operation outcome determination, and so on. Executing multiple slice tasks on two or more compute slices enables parallelized operations, thus increasing performance.

Programs that are executed by the compute slices within the processing unit can be associated with a wide range of applications. The applications can be based on data manipulation, such as image, video, or audio processing applications; AI and machine learning applications; business applications; data processing and analysis; and so on. The slice tasks that are executed can perform a variety of operations including arithmetic operations, shift operations, logical operations including Boolean operations, vector or matrix operations, tensor operations, and the like. The slice tasks can be executed based on branch prediction, operation precedence, priority, coding order, amount of parallelization, data flow, data availability, compute slice availability, communication channel availability, and so on. Slice tasks that comprise a compiled program are generated by a compiler. The compiler can include a general-purpose compiler, a hardware description-based compiler, a compiler written or "tuned" for the specific number of compute slices in the processor unit, a constraint-based compiler, a satisfiability-based compiler (SAT solver), and so on. Control is provided to the hardware by the control unit which allocates slice tasks to compute slices. Once issued, the slice tasks can execute independently from the control unit and other compute slices until they are either halted by the control unit, indicate an exception, finish executing, etc. In this way, a compiled task can be executed by the processing unit.

The compute slices within the processing unit can be implemented with central processing units (CPUs), graphics processing units (GPUs), application specific integrated circuits (ASICs), field programmable gate arrays (FPGAs), processing cores, or other processing components or combinations of processing components. The compute slices can include heterogeneous processors, homogeneous processors, processor cores within an integrated circuit or chip, etc. The compute slices can be coupled to local storage, which can include load-store units, local memory elements, register files, cache storage, etc. The cache, which can include a hierarchical cache such as an L1, L2, and L3 cache, can be used for storing data such as intermediate results, compute slice operations, and the like. Any level of cache (e.g., L1, L2, L3, etc.) can be shared by two or more compute slices. The local storage can be coherent.

The first compute slice issues the load instruction to a first LMDU within the first compute slice. The issuing includes saving, in a memory operation table (MOT) within the first LMDU, load information associated with the load instruction. The first LMDU sends the load information to the GMDU, wherein the load instruction was not fully serviced by the MOT. The sending includes storing, in a global memory operation table (GMOT) within the GMDU, the load information. The saved load instruction can be coalesced with other instructions, whether load or store instructions, which access the same address as the load address. The GMOT detects address aliasing between the load address and an address of one or more previously issued memory instructions. The address of the one or more previously issued memory instructions is saved in the GMOT. The detecting that a previously issued memory instruction and a load instruction alias to the same address indicates that load data required by the load instruction may be available in the GMOT. The GMOT forwards to the MOT memory information from the one or more previously issued memory instructions. The memory information satisfies one or more bytes of data required for the load instruction. The GMDU performs global alias checking against the load instruction. The global alias checking includes one or more other LMDUs in the plurality of LMDUs. When a match is found, the GMDU provides the load instruction with one or more additional bytes of data required for the load instruction.

Checking memory operations is enabled by accessing a processing unit comprising a plurality of compute slices, a control unit, a plurality of local memory disambiguation units (LMDUs), and a global memory disambiguation unit (GMDU). The processing unit further includes a memory system. Each compute slice within the plurality of compute slices includes at least one execution unit. The execution unit can include multicycle elements for multiplication, division, and square root computations; arithmetic logic units (ALUs); storage elements; scratchpads; and other components. The components can communicate among themselves to exchange data, signals, and so on. Each compute slice can be coupled to a successor (next) compute slice and a predecessor (previous) compute slice. Further, each compute slice is coupled to an LMDU in the plurality of LMDUs. Additionally, each LMDU in the plurality of LMDUs is coupled to the GMDU. The control unit can distribute a first slice task to a first compute slice. The first slice task can include a set of instructions that will be executed by a first compute slice. A first compute slice in the plurality of compute slices executes a first slice task. The first slice task includes a load instruction, and the load instruction includes a load address. The first compute slice issues the load instruction to a first LMDU within the first compute slice. The issuing includes saving, in a memory operation table (MOT) within the first LMDU, load information associated with the load instruction. The load information includes requested data from the load address. The first LMDU sends the load information to the GMDU. The load information is sent when the load instruction was not fully serviced by the MOT. The sending includes storing, in a global memory operation table (GMOT) within the GMDU, the load information. The GMOT detects address aliasing between the load address and an address of one or more previously issued memory instructions. The address of the one or more previously issued memory instructions is saved in the GMOT. The address can include one or more addresses sent by one or more other LMDUs within the processing unit to the GMDU. The GMOT forwards to the MOT memory information from the one or more previously issued memory instructions. The memory information satisfies one or more bytes of data required for the load instruction.

FIG. 1 is a flow diagram for global memory disambiguation for a parallel architecture with compute slices. Compute slices within a processing unit can be issued blocks of code, called slice tasks, for execution. The processing unit can include any number of compute slices. The slice tasks can be associated with a compiled program. The compiled program, when executed, can perform a variety of operations associated with data processing. The processing unit can include elements such as compute slices, a control unit, local memory disambiguation units (LMDUs), barrier register sets, and a memory system. The processing unit can further interface with a global memory disambiguation unit (GMDU). The processing unit can include further elements such as ALUs, memory management units (MMUs), GPUs, multicycle elements (MEMs), and so on. The operations executed by the processing unit can accomplish a variety of processing objectives such as application processing, data manipulation, data analysis, modeling and simulation, and so on. The operations can accomplish artificial intelligence (AI) applications such as machine learning. The operations can manipulate a variety of data types including integer, real, floating point, and character data types; vectors, matrices, and arrays; tensors; etc. To maintain the integrity of the program that is executing, all memory operations are committed according to the memory model. In embodiments, all memory instructions are committed in program order. Load instructions associated with a slice task can be checked against previously executed memory instructions that include loads and stores. In embodiments, the checking can be performed within the GMDU against previously executed memory instructions that occur in the same slice task as the load or in other slices. When an address alias is detected, memory information from the previously issued store instructions can be forwarded to the load instruction. The forwarding can be performed when the store information satisfies one or more bytes of data required for the load instruction.

The flow 100 includes accessing 110 a processing unit comprising a plurality of compute slices, a control unit, a plurality of local memory disambiguation units (LMDUs), and a global memory disambiguation unit (GMDU), wherein each compute slice within the plurality of compute slices includes at least one execution unit and is coupled to a successor compute slice and a predecessor compute slice, wherein each compute slice within the plurality of compute slices is coupled to an LMDU in the plurality of LMDUs, and wherein each LMDU in the plurality of LMDUs is coupled to the GMDU. The processing unit can further include a memory system. The compute slices within the processing unit can be implemented with central processing units (CPUs), graphics processing units (GPUs), application specific integrated circuits (ASICs), field programmable gate arrays (FPGAs), processing cores, or other processing components or combinations of processing components. The compute slices can include heterogeneous processors, homogeneous processors, processor cores within an integrated circuit or chip, etc. In embodiments, compute slices within the processing unit have identical functionality. In other embodiments, the compute slices within the processing unit have different functionality. The compute slices can be coupled to a barrier register set which can enable data transfer between compute slices. The compute slices can share a variety of computational resources within the processing unit. In embodiments, the plurality of compute slices is coupled in a ring configuration. The ring configuration can include barrier registers which are coupled between compute slices. Other topologies, such as a matrix topology, are possible. The topology can be selected for a specific application such as machine learning. A topology for machine learning can include supervised learning, unsupervised learning, reinforcement learning, and other machine learning topologies. A topology for machine learning can include an artificial neural network topology. Each LMDU is coupled to the GMDU. The GMDU is coupled to a memory system. The GMDU can “look across” each LMDU within the plurality of LMDUs.

The execution units within the compute slices can include multicycle elements for multiplication, division, and square root computations; arithmetic logic units (ALUs); storage elements; scratchpads; and other components. The components can communicate among themselves to exchange data, signals, and so on. In embodiments, more than one processing unit can be accessed. Two or more processing units can be colocated on an integrated circuit or chip, on multiple chips, and the like. In embodiments, two or more processing units can be stacked to form a three-dimensional (3D) configuration. The memory system can include local memory elements, register files, cache storage, etc. The cache, which can include a hierarchical cache, can be used for storing data such as intermediate results, compute slice operations, and the like. The cache can include an L1 cache, L2 cache, L3 cache, and so on. Any level of cache can be shared by two or more compute slices. In embodiments, the cache architecture is write-through. In other embodiments, the cache architecture is write-back. In some embodiments, the hierarchical cache is coherent. The control unit can be coupled to each of the compute slices within the processor unit. The control unit and the compute slices can communicate status information about the compute slice and execution status of a slice task. In embodiments, the status information can include bits which determine the state of the compute slice, such as idle, executing, holding, done, and so on.

A compiled program is divided into slice tasks. Slice tasks comprise code sequences of various sizes which include at least one load instruction. A control unit can allocate any number of slice tasks to compute slices, one slice task per compute slice. The control unit can allocate a first slice task, which can be a predecessor slice task that can run non-speculatively while all other successive slice tasks run speculatively. The control unit can allocate a second slice task to a second compute slice, which can execute on the next immediate successor compute slice while the first slice task is executing. The second slice task can be executed speculatively. Successor slice tasks can be allocated by the control unit at any time during execution of the compiled program.

Each compute slice is coupled to a successor compute slice and a predecessor compute slice by a barrier register set. The coupling can result in a ring configuration. The coupling of the compute slices enables data communication between compute slices. For example, a current compute slice can be coupled to an immediately succeeding compute slice by a current barrier register set. The current barrier register set provides unidirectional communication from the current compute slice to the successor compute slice. Thus, the current compute slice can write to the current barrier register set and the successor compute slice can read from the current barrier register set. Pointers are used to determine how slice tasks are assigned and controlled by the control unit. The pointers can be part of the internal control unit state. The pointers can include a head pointer and a tail pointer. In embodiments, the head pointer indicates which compute slice is executing non-speculatively, and therefore is known to be part of the executed program. In embodiments, the tail pointer indicates which compute slice was the last to receive a slice task by the control unit. A head slice can be a compute slice which is pointed to by the head pointer. Likewise, a tail slice can be a compute slice pointed to by a tail pointer. In embodiments, a compute slice can execute speculatively if it is not the head slice. In other embodiments, the control unit distributes a slice task to a compute slice succeeding the tail slice. After distribution, the control unit can update the tail slice to point to the succeeding compute slice for further distribution of slice tasks to downstream compute slices. In embodiments, the head pointer and the tail pointer point to the same compute slice. The head pointer and the tail pointer can be updated, by the control unit, based on slice task execution status, branch operation outcome determination, and so on. Executing multiple slice tasks on two or more compute slices enables parallelized operations, increasing performance.

The control unit can distribute slice tasks to one or more compute slices within the plurality of compute slices. The flow 100 includes distributing 112, by the control unit, the first slice task to the first compute slice. The first slice task can include one or more instructions such as arithmetic and logical instructions, memory access instructions, and so on. In embodiments, the first compute slice is coupled to a first LMDU within the plurality of LMDUs. The LMDU can determine whether two or more operations such as memory access operations access the same memory address. Discussed below, when the same memory address is accessed by two or more operations, the LMDU can determine what data can be provided by the LMDU. In embodiments, the distributing can include a second compute slice. The second compute slice can be allotted a task. In the flow 100, the distributing includes allotting a second slice task 114 to a second compute slice within the plurality of compute slices. The second compute slice can be coupled to a barrier register set, where the barrier register set is further coupled to the first compute slice. The flow 100 further includes initializing pointers 116, wherein a head pointer points to the first compute slice, and wherein a tail pointer points to the second compute slice. Because the processing unit includes multiple compute slices, slice tasks can be executed in parallel. A slice task can be executed non-speculatively, while other slice tasks can be executed speculatively. In embodiments, the head pointer can point to a slice task that is running non-speculatively. The tail pointer can point to a slice task that is executing speculatively.

As described earlier, pointers are used to determine how slice tasks are assigned and controlled by the control unit. The pointers can be part of the internal control unit state. The pointers can include a head pointer and a tail pointer. In embodiments, the head pointer indicates which compute slice is executing non-speculatively and therefore is known to be part of the compiled program. In embodiments, the tail pointer indicates which compute slice was the last to receive a slice task by the control unit. A head slice is a compute slice which is pointed to by the head pointer within the control unit. Likewise, a tail slice is a compute slice pointed to by a tail pointer within the control unit. In embodiments, a compute slice executes speculatively if it is not the head slice. Thus, the distributing can result in a compute slice executing a slice task speculatively. In other embodiments, the control unit distributes a slice task to a compute slice which succeeds the tail slice. After distribution, the control unit can update the tail pointer to point to the next succeeding compute slice for further distribution of slice tasks to downstream compute slices.

The flow 100 includes executing 120, by the first compute slice in the plurality of compute slices, a first slice task, wherein the first slice task includes a load instruction, and wherein the load instruction includes a load address. Discussed previously, the first slice can include one or more instructions, where the instructions can include arithmetic, logical, and memory access instructions, and so on. The memory access instructions can include store instructions and load instructions. The load instruction included in the first slice task can access an address in storage such as a memory system. In embodiments, the load instruction can include a 64-bit aligned address. Copies of the contents of the storage address may be available locally to the compute slice, such as in an LMDU.

The flow 100 includes issuing 130, by the first compute slice, the load instruction to the first LMDU within the first compute slice, wherein the issuing 130 includes saving 132, in a memory operation table (MOT) within the first LMDU, load information associated with the load instruction. The issuing can be accomplished using a bus, a network such as a network-on-chip (NOC), and so on. The MOT can be used to save a variety of information such as address information, store information, and the load information. In embodiments, the memory operation table can include any number of entries, such as 8 or 16. Each entry can include address information and at least one of a store operation, a load operation, or both. As the compute slice executes the slice task, further load operations and/or store operations can be encountered. In embodiments, the executing can include a second load instruction, wherein the second load instruction includes the load address. Embodiments include adding load information to the MOT row associated with the second load instruction based on the load address. A similar technique can be used for a second store operation. In embodiments, the executing includes a second store instruction, wherein the second store instruction is associated with the load address. The information associated with the second store instruction can be stored in the MOT. Embodiments include coalescing, in the LMDU, a new store information associated with the second store instruction, with the store information. In the flow 100, the saving includes checking 134, by the MOT, for an aliasing between the load address and a previously executed store instruction. Discussed throughout, if aliasing is detected between the load address and a previously executed store instruction, that data required by the load instruction may be provided by the MOT. In embodiments the aliasing is not detected. The flow 100 further includes arbitrating 136, between the first LMDU and one or more LMDUs in the plurality of LMDUs, for access to the GMDU. The arbitrating can be based on a priority, a precedence, round robin scheduling, and so on. In embodiments, the arbitrating can be based on whether a slice task is executing non-speculatively or speculatively. A slice task executing non-speculatively can include the head task slice and therefore can have priority over access by speculatively executing slice tasks.

The load address associated with the load instruction that is being executed may not alias to an address within the MOT. Discussed previously and throughout, in embodiments, the processing unit includes a global memory disambiguation unit (GMDU). Each LMDU in the plurality of LMDUs is coupled to the GMDU. The GMDU can interface to a memory system. The flow 100 includes sending 140, by the first LMDU, the load information to the GMDU, wherein the load instruction was not fully serviced by the MOT. The issuing can be accomplished using a bus, a network such as a network-on-chip (NOC), and so on. In the flow 100, the sending includes storing 142, in a global memory operation table (GMOT) within the GMDU, the load information. The GMOT can be used to save a variety of information sent to it by the MOT. The information stored in the GMOT can include address information, store information, and load information. In embodiments, the global memory operation table can include any number of entries such as 8 entries, 16 entries, and so on. Each entry can include address information and at least one of a store operation, a load operation, or both. In the flow 100, the storing includes evicting a row 144 of the GMOT, wherein the GMOT is full. A row can be evicted for a variety of reasons to make way for a new row. A row can be occupied by load information and/or store information that originates from one or more compute slices. The compute slices can include the head slice, a tail slice, intermediate slices, and so on. Recall that compute slice can be executing a slice task non-speculatively (e.g., the head slice) or speculatively (e.g., other slices). In embodiments, the first compute slice is a head slice. Typically, rows in the GMOT associated with the head slice cannot be evicted until the head slice load instruction has been satisfied, because the head slice is executing non-speculatively. In other embodiments, the row of the GMOT that was evicted is associated with one or more successor compute slices, wherein the row of the GMOT is not associated with a head slice. In this latter case, since the successor compute slices were executing speculatively, a row associated only with the successor slices can be evicted so that the head slice can continue executing. In the case where loads and/or stores from the head slice fill the GMOT, back pressure can be applied to the head slice until the GMOT is able to clear entries, making space for additional loads and/or stores.

The flow 100 includes detecting 150, by the GMOT, address aliasing between the load address and an address of one or more previously issued memory instructions, wherein the address of the one or more previously issued memory instructions is saved in the GMOT. In embodiments, the one or more previously issued memory instructions can include one or more previously executed store instructions. In other embodiments, the previously issued memory instruction can be a previously executed load instruction. Discussed previously, a load address and a store address can alias to the same memory address, whether a load address, a store address, or both. If the memory instruction data is valid, and the load instruction can obtain some or all of its needed data from the memory instruction, then data can be provided to the load instruction. Providing data from the GMDU is substantially faster than accessing data in storage. In embodiments, the detecting is based on the GMOT. One or more store addresses saved in the GMOT can be compared to the load address. When address aliasing is detected between the load address and a memory address, then some or all of the load data can be obtained from the GMDU. Note that an alias check can have false positives, but never false negatives. This can be used to optimize the operation by overriding potential detections based on not considering the false negative case, that is, relying on the fact that false negatives cannot actually occur. In embodiments, the detecting, by the GMOT, address aliasing between the load address and an address of one or more previously issued memory instructions is selectively overridden, based on an exclusion of any false negative aliases.

The flow 100 includes forwarding 152, by the GMOT, to the MOT, memory information from the one or more previously issued memory instructions, wherein the memory information satisfies one or more bytes of data required for the load instruction. When address aliasing is detected between the load address and an address of a previously executed memory instruction, then one or more bytes of data can be forwarded to the load instruction. The memory data can be forwarded when the data is valid. The satisfying one or more bytes of the data requirement can be based on bytes changed by the previously executed memory instruction, bytes that are valid, and so on. Discussed previously, if some or all of the bytes required to satisfy the load instruction are not available in the GMDU, then the additional required bytes of data can be obtained from a shared memory.

The flow 100 further includes coalescing 154, within the GMOT, one or more additional store instructions, wherein the one or more additional store instructions include a same store address, wherein the one or more additional store instructions are obtained 156 from the first LMDU. In embodiments, one or more additional store instructions can originate from and can be executed by the compute slice based on the slice task. In the flow 100, the sending by the first LMDU to the GMDU is associated with the head slice 158. Recall that pointers can be used to point to compute slices, including a head pointer that points to the head slice and a tail pointer that points to the tail slice. Recall also that the head slice executes a slice task non-speculatively, while other compute slices, including a slice pointed to by the tail pointer, can execute speculatively, an exception occurring when the head pointer and the tail pointer point to the same slice. The flow 100 further includes updating a memory 160, by the GMOT, wherein the compute slice is a head slice. Since the head slice is executing non-speculatively, a store instruction can commit its store data to memory. Other slices which are executing speculatively cannot update memory until after the head slice has committed data to memory, and a determination is made as to which speculatively executing slice tasks can continue execution and which will be terminated.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
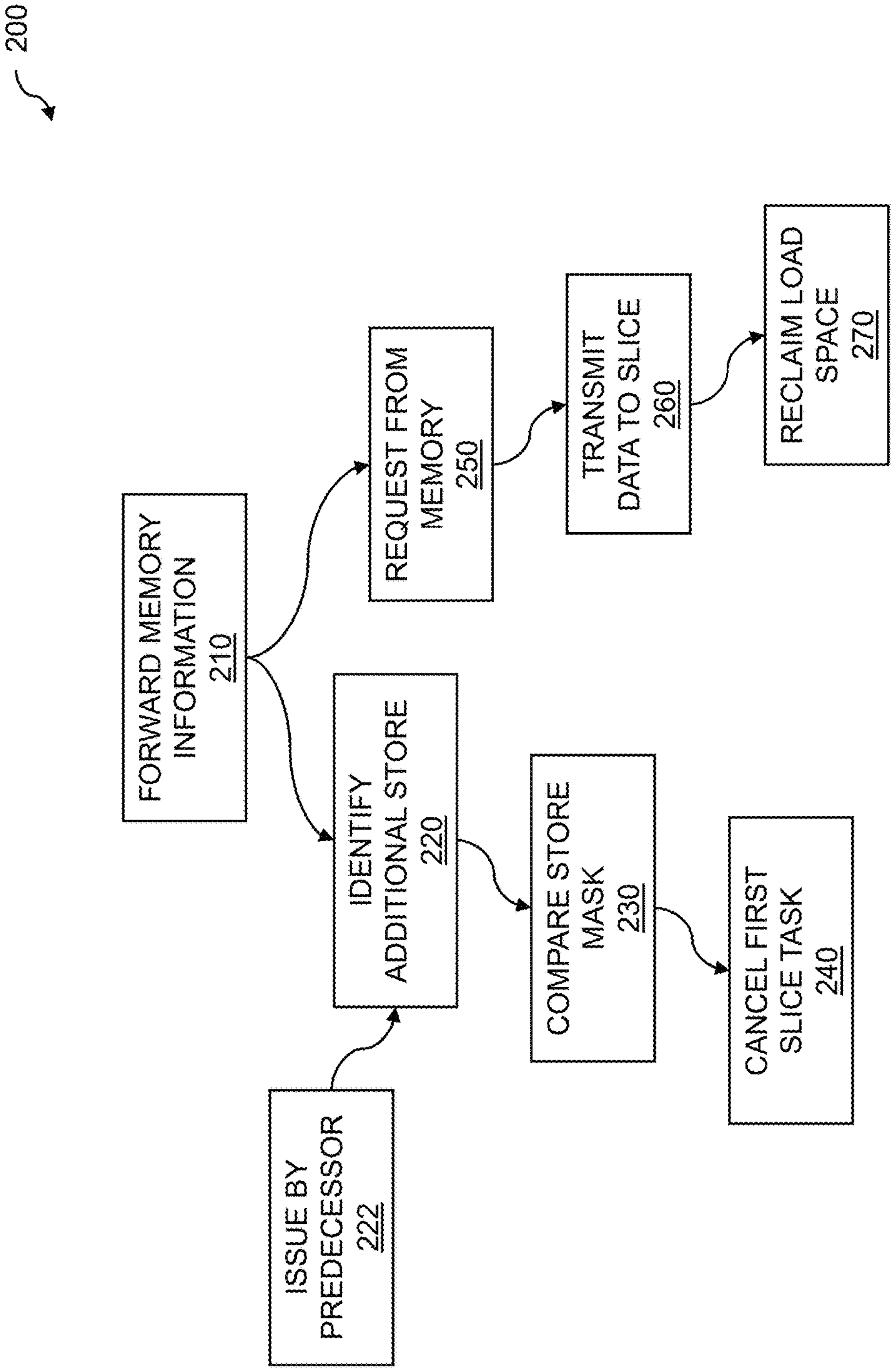
FIG. 2 is a flow diagram for forwarding memory information.

FIG. 2 is a flow diagram for forwarding memory information. As described above and throughout, the control unit associated with the processing unit can distribute a first compute slice task to a first compute slice within the plurality of compute slices. The first compute slice is coupled to a first LMDU within the plurality of LMDUs. The first compute slice can execute the first slice task, where the first slice task includes a load instruction, and the load instruction includes a load address. The first compute slice can issue the load instruction to the first LMDU within the first compute slice. The issuing can include saving, in a memory operation table (MOT) within the LMDU, load information associated with the load instruction. Load information can include a plurality of fields, where the fields can include a data field, one or more masks, an issued flag, and so on. The first LMDU can send the load information to the GMDU. The sending to the GMDU can occur when the load instruction was not fully serviced by the MOT. The sending to the GMDU can include storing, in a global memory operation table (GMOT) within the GMDU, the load information. The GMDU can effectively look across the plurality of LMDUs that have saved data to the GMOT for data required to satisfy the load instruction. If the required data is not available within other LMDUs, then the load information can be directed to memory such as system memory, shared memory, and so on. The GMOT can forward, to the MOT, an amount of memory information from the one or more previously issued memory instructions. The GMOT can further forward memory information obtained from memory. The memory information can satisfy one or more bytes of data required for the load instruction.

The flow 200 includes forwarding 210, by the GMOT to the MOT, memory information from the one or more previously issued memory instructions, wherein the memory information satisfies one or more bytes of data required for the load instruction. As discussed previously, when address aliasing is detected between the load address within a current slice task and an address of a previously executed memory instruction from a previous slice task, then one or more bytes of data can be forwarded to the load instruction associated with the current slice task. The one or more bytes of data can be obtained from the previously issued memory instruction that was stored in the GMOT. For example, a previously executed memory instruction can be a previously executed store instruction which stored one byte of valid data to the memory system. The one byte of valid data can be represented with one or more masks in the GMOT as will be described later. The previously executed store instruction can alias, in the GMOT, with a load instruction from the current compute slice which is attempting to load four bytes of memory. If the one byte from the store instruction is coincident with one of the four bytes of data requested by the load instruction, then the one byte from the store instruction can be forwarded to the load instruction. The other three bytes can be obtained by accessing memory. Thus, if some or all of the bytes required to satisfy the load instruction are not available in the GMDU, then the additional required bytes of data can be obtained from a shared memory.

The flow 200 further includes identifying an additional store instruction 220 to the load address, wherein the additional store instruction was issued by a predecessor 222 compute slice, and wherein the additional store instruction was issued after the forwarding 210. After data is forwarded from the previously executed memory instruction, which can be a store instruction, an additional store instruction can be issued by a predecessor compute slice. If the store address of the additional store instruction overlaps the address of the load address issued by the first slice task, then additional checking, explained below, can be performed to determine if the data that was forwarded is obsolete. If so, then the first slice task can be cancelled.

The flow 200 further includes comparing 230, by the GMOT, a store mask associated with the additional store instruction to a load mask associated with the load instruction, wherein at least one bit of the store mask matches the load mask. When at least one bit of the store mask matches the load mask, then the data that was forwarded 210 may be obsolete. To further check if the data was obsolete, the bytes of data that were forwarded, as indicated by the load mask, can be compared to the data that was stored by the additional store instruction. If the data is different, then the data that was forwarded 210 by the GMOT is made obsolete by the additional store instruction. In embodiments, data associated with the at least one bit is not identical between load data associated with the load instruction and store data associated with the additional store instruction.

The flow 200 further includes cancelling 240 the first slice task, by the first LMDU, wherein the MOT has already sent, to the first compute slice, the one or more bytes of data required for the load instruction. If the additional store instruction 220 caused the data that was forwarded 210 to be obsolete, then the first compute slice can be cancelled 240. The obsolete condition can be determined by the LMDU. It is possible that the LMDU did not yet forward the data from the load instruction back to the first compute slice. If the load data was not yet forwarded, the entry in the LMDU can be invalidated and the first slice task can continue execution. If the LMDU already forwarded the data to the first compute slice when the obsolete condition was determined, then the LMDU can cancel execution of the first slice task. In embodiments, the cancelling is performed by the LMDU, not the GMDU.

Discussed previously and throughout, when data required to satisfy a load instruction is not available in a LMDU, the load instruction can be sent by the LMDU to the GMDU. The GMDU can “look across” the plurality of LMDUs for load data needed to satisfy one or more bytes of data required for the load instruction. If the requested data cannot be found in the GMDU, then the data can be sought in memory. In the flow 200, the forwarding includes requesting from memory 250, by the GMOT, one or more additional bytes of data required for the load instruction. The memory can include a system memory, a shared memory, a cache memory such as a single-level cache or a multi-level cache, and so on. The GMOT can receive the requested data from the memory after one or more cycles. The GMOT can forward the information received from the memory to the MOT from which the load instruction originated. The flow 200 further includes transmitting 260, by the MOT, to the first compute slice, the one or more bytes of data required for the load instruction. The transmitting can be accomplished using a data bus, a shared bus, a network such as a network-on-chip (NOC), and the like. At some point in handling a load instruction, one or more bytes of data that satisfy the load instruction are forwarded to the load instruction. The load instruction can complete, and execution of the slice task can continue. The flow 200 further includes reclaiming 270 load space within the GMOT, wherein the load space was associated with the one or more bytes of data required for the load instruction, and wherein a compute slice associated with the load space is a head slice. The GMOT includes the load data within a load space within the GMOT until the compute slice that is associated with the load data becomes the head slice. At that time, the load space, which held load data, a load valid mask, etc., can be freed when the load instruction has been satisfied by receiving load data from one or more of the MOT, the GMOT, and the memory. Since the head slice is the slice that is executed non-speculatively, load and store operations associated with the head slice can be released from the GMOT.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
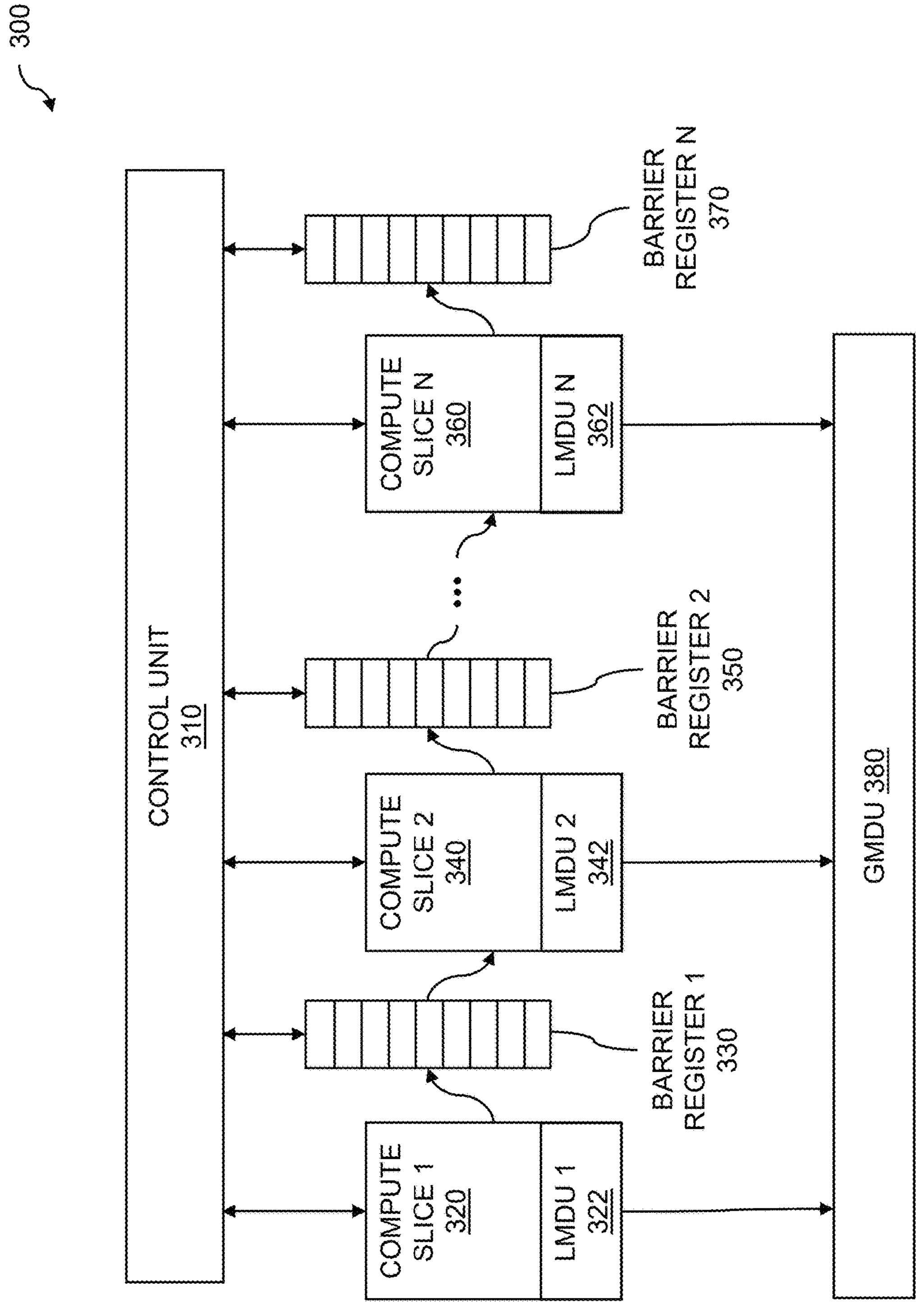
FIG. 3 is a block diagram for compute slice and load-store unit control.

FIG. 3 is a block diagram for compute slice and load-store unit control. A processor unit can include a plurality of elements that enable processing of data. The processor unit can be used to process data for applications such as image processing, audio and speech processing, artificial intelligence and machine learning, and the like. The processor unit can include a variety of elements, where the elements include compute slices; a control unit; a plurality of local memory disambiguation units (LMDUs); a global memory disambiguation unit (GMDU); a memory system; busing, switching and networking; etc. In embodiments, each compute slice within the plurality of compute slices includes at least one execution unit. Each compute slice is coupled to an LMDU. The compute slices can obtain data for processing from storage. The data can be obtained from the memory system, cache memory, a scratchpad memory, register files, etc. The compute slices can be coupled in a ring configuration, where each compute slice can be coupled to a predecessor and a successor compute slice using a barrier register. A compute slice can only write to a barrier register between it and the successor compute slice, and a successor compute slice can only read from the barrier register. The control unit can control data access, data processing, etc. by the compute slices.

Compute slice control and load-store unit control enable global memory disambiguation for a parallel architecture with compute slices. A processing unit is accessed, comprising a plurality of compute slices, a control unit, a plurality of local memory disambiguation units (LMDUs), and a global memory disambiguation unit (GMDU). Each compute slice within the plurality of compute slices includes at least one execution unit. Each compute slice is coupled to a successor compute slice and a predecessor compute slice. Each compute slice within the plurality of compute slices is coupled to an LMDU in the plurality of LMDUs, and each LMDU in the plurality of LMDUs is coupled to the GMDU. A first compute slice in the plurality of compute slices executes a first slice task. The first slice task includes a load instruction, and the load instruction includes a load address. The first compute slice issues the load instruction to a first LMDU within the first compute slice. The issuing includes saving, in a memory operation table (MOT) within the first LMDU, load information associated with the load instruction. The first LMDU sends the load information to the GMDU, where the load instruction was not fully serviced by the MOT. The sending includes storing, in a global memory operation table (GMOT) within the GMDU, the load information. The GMOT detects address aliasing between the load address and an address of one or more previously issued memory instructions. The address of the one or more previously issued memory instructions is saved in the GMOT. The GMOT forwards, to the MOT, memory information from the one or more previously issued memory instructions. The memory information satisfies one or more bytes of data required for the load instruction.

Compiled programs can comprise a plurality of slice tasks, where the slice tasks can be executed on a processing unit. The processing unit can include compute slices, where the compute slices can enable parallel processing architecture. Some slice tasks associated with the program can be executed in parallel, while others must be properly sequenced. The sequential execution and the parallel execution of the slice tasks are dictated in part by the existence of or absence of data dependencies between slice tasks. In a usage example, compute slice A, running slice task A, processes input data and produces output data that is required by compute slice B, running slice task B. Each compute slice is coupled to a local memory disambiguation unit (LMDU). For correct results, slice task A must first generate the input required by slice task B before slice task B can fully execute on compute slice B. In embodiments, slice task B can execute speculatively, wherein the speculative execution does not depend on inputs from slice task A. When slice B execution gets to the point where it depends on input from slice A, compute slice B can stall while waiting for results from the predecessor slice. Once the results are obtained, compute slice B can continue to execute slice task B speculatively while slice task A proceeds. Compute slice C, however, holds slice task C which executes instructions that process the same input data as slice task A, and also produces its own output data. Thus, slice task C can be speculatively executed in parallel with slice tasks A and B.

The execution of tasks such as slice tasks can be based on memory access operations, where the memory access operations include data loads from memory, data stores to memory, load-modify-store operations, and so on. Some of the slice tasks can share data, provide processed data to other slice tasks, and the like. To continue the usage example above, slice task B executing on compute slice B can include a load instruction that includes a load address. The load instruction can be issued to the first LMDU associated with slice B. The issuing can include saving load information. The load information can be saved in a memory operation table (MOT) within the LMDU. The first LMDU can send the load information to the GMDU. The sending can be based on the load instruction not being fully serviced by the MOT. The sending can include storing the load information in a global memory operation table (GMOT) within the GMDU. The GMDU can detect address aliasing between the load address and an address of one or more previously issued memory instructions. The previously issued memory instruction can include an instruction such as a store instruction issued by slice task A executing on compute slice A. Memory information from the one or more previously issued memory instructions can be forwarded by the GMOT to the MOT. The forwarding can be performed when the memory information satisfies one or more bytes of data required for the load instruction. That is, previous memory instruction information, such as load or store information generated by a slice task other than slice task A, can be forwarded to slice task A without having to first store information to a cache or memory system prior to loading by a slice task such as slice task B.

Block diagram 300 can include a control unit 310 within the processor unit. The control unit can be used to control one or more compute slices, barrier registers, LMDUs, and so on associated with the processing unit. The control unit can operate based on receiving a set of slice tasks from a compiler. The compiler can include a high-level computer, a hardware language compiler, a compiler developed for use with the processing unit, and so on. The control unit can distribute and allocate slice tasks to compute slices associated with the processing unit. The control unit can be used to commit a result of a slice task to a barrier register as the slice task is executing, or when execution of the slice task has been completed. The control unit can perform checking and control operations. The checking and control operations can include checking that a slice task is a next sequential slice task in a compiled program; distributing slice tasks; cancelling slice tasks; moving a head pointer and a tail pointer; allowing a compute slice to commit results to memory; and so on. The control unit can perform state assignment operations. Embodiments include assigning, by the control unit, a state to each compute slice in the plurality of compute slices, wherein the state is one of idle, executing, holding, or done. The assigned states can be used to determine whether a compute slice is ready to receive a slice task, data is ready to be committed, etc. The state of a compute slice can be used for exception handling techniques. The exception handling techniques can be associated with nonrecoverable exceptions and recoverable exceptions, interrupts, etc.

The processing unit can include a plurality of compute slices. The compute slices can be issued, by the control unit, slice tasks for execution. The slice tasks can include blocks of code associated with a compiled program generated by the compiler. In the figure, the compute slices include compute slice 1 320, compute slice 2 340, and compute slice N 360. The number of compute slices that can be included in the processing unit can be based on a processing architecture, a number of processor cores on an integrated circuit or chip, and the like. A local memory disambiguation unit (LMDU) can be included in each compute slice. The LMDU can be used to provide load data obtained from a memory system for processing on the associated code slice. The LMDU can be used to hold store data generated by the compute slice and can be designated for storing in the memory system. The LMDU can detect address aliasing between a load address and a store address of a previously issued store instruction. The LMDUs can include LMDU 1 322 included in compute slice 1 320; LMDU 2 342 included in compute slice 2 340; and LMDU N 362 included in compute slice N 360. The detecting can be based on a memory operation table (MOT) within the LMDU. The MOT can forward store information, from the previously issued store instruction, to one or more bytes of information that satisfy data requirements for the load instruction. As the number of compute slices changes for a particular processing unit architecture, the number of LMDUs can change correspondingly.

The LMDUs can be coupled to a global memory disambiguation unit (GMDU) 380. The GMDU can "look across" all of the LMDUs to perform global alias checking against the load instruction. That is, the data requested by the load instruction may be present in one of the other LMDUs. The GMDU can also provide requested data that is not present in a LMDU. The GMDU can be coupled to an element within one or more storage elements (not shown). The storage elements can include cache such as data cache (not shown), a memory system (not shown), and so on. In embodiments, the memory system can include a global memory disambiguation unit (GMDU). Each LMDU in the plurality of LMDUs is coupled to the GMDU. The cache can include a single-level cache, a multi-level cache, etc. The memory system can include a shared memory system, where the shared memory system can be shared between or among two or more processing units. Additional load instructions can be issued. Embodiments include rejecting, by the LMDU, the load instruction. The load instruction can be rejected and executed at a later time, because the requested load data is not available, not yet complete, etc.

The communication between the LMDUs and the GMDU can include sending a load instruction to the GMDU. In embodiments, the issuing the load instruction includes sending, by the first LMDU, the load instruction to the GMDU. The sending can be accomplished using a bus, a network, and so on. The sending can be performed when the load instruction was not fully serviced by the MOT. In embodiments, the sending can include storing, in a global memory operation table (GMOT) (not shown) within the GMDU, the load information. The memory operation table can mark the load instruction as issued. The marking can prevent duplication of sending the load request. The GMDU can perform various operations on the load instruction. Embodiments can include detecting, by the GMOT, address aliasing between the load address and an address of one or more previously issued memory instructions. The address aliasing can be detected for memory instructions including load instructions and store instructions. The address aliasing can be detected within the GMDU. In embodiments, the address of the one or more previously issued memory instructions can be saved in the GMOT. The alias checking can check an aliased load instruction and a previously issued memory instruction. Recall that when the detecting does detect address aliasing between the load instruction and the previous memory instruction, the store information can be forwarded by the GMOT to the MOT. The forwarded information can include one or more bytes, but may not include all information bytes requested by the load instruction. Further embodiments can include providing, by the GMDU, the load instruction with one or more additional bytes of data required for the load instruction. Thus, information that is not present in the MOT may be provided by the GMDU. If the information is not present in the GMDU, then the information can be sought in a cache, the memory system, etc.

The block diagram 300 can include a plurality of sets of barrier registers. The barrier registers can be used to hold load data to be processed by a compute slice, to receive store data generated by a compute slice, and so on. In embodiments, a second compute slice can be coupled to a first compute slice by a first barrier register set in the plurality of barrier register sets. In the block diagram, barrier register 1 330 can couple compute slice 2 340 to compute slice 1 320, barrier register 2 350 can couple compute slice 3 (not shown) to compute slice 2 340, barrier register N 270 can couple compute slice N+1 (not shown) to compute slice N 360, etc. Slice tasks can be issued to compute slices in an order. In block diagram 300, the order can be visualized as from left to right. That is, a left-hand compute slice or predecessor compute slice only needs to write to a barrier register coupled to a right-hand compute slice or successor. A successor compute slice does not need to write to a processor compute slice, nor does a predecessor compute slice need to read from a successor compute slice. In an implementation example, a successor compute slice can be to the left or the right of its predecessor. In further embodiments, the plurality of compute slices and the plurality of barrier register sets can be coupled in a ring configuration. Thus, barrier register N 370 can be coupled between compute slice N 360 and compute slice 1 320.

Data movement to, from, and within the processing unit, whether loading, storing, transferring, etc., can be accomplished using a variety of techniques. In embodiments, memory system access operations can be performed outside of processing unit, thereby freeing the compute slices within the processing unit to execute slice tasks. Memory access operations, such as autonomous memory operations, can preload data needed by one or more compute slices. The preloaded data can be placed in buffers associated with compute slices that require the data. In additional embodiments, a semi-autonomous memory copy technique can be used for transferring data. The semi-autonomous memory copy technique can be accomplished by the processing unit which generates source and target addresses required for the one or more data moves. The processing unit can further generate a data size such as 8, 16, 32, or 64-bit data sizes, and a striding value. The striding value can be used to avoid overloading a column of storage components such as a cache memory.

Figure 4:
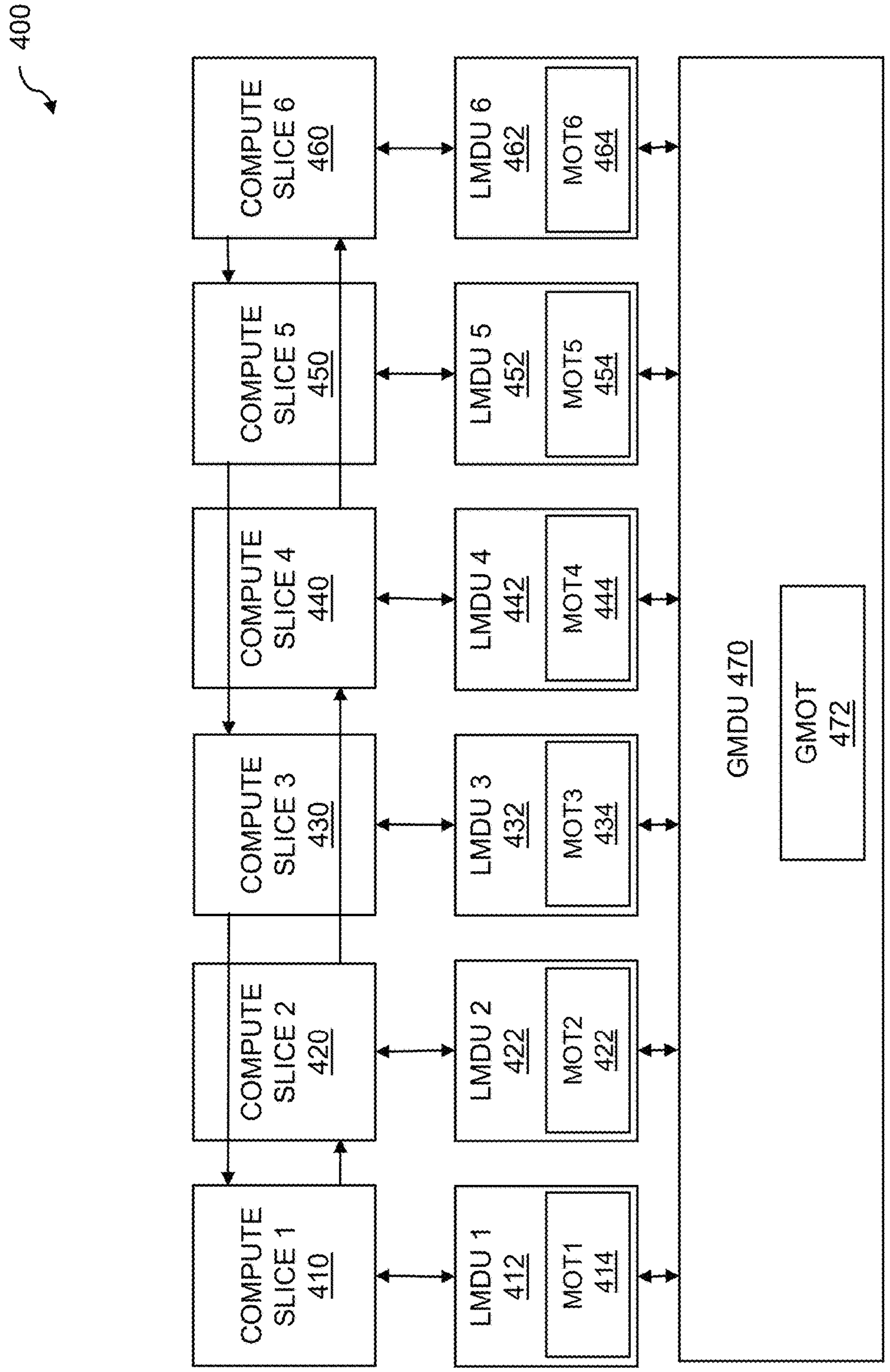
FIG. 4 is a block diagram for a ring configuration of compute slices and load-store units.

FIG. 4 is a block diagram for a ring configuration of compute slices and load-store units. The load-store units can include local memory disambiguation units (LMDUs). The LMDUs can each be coupled to a global memory disambiguation unit (GMDU). Described previously and throughout, a processing unit can be used to execute a compiled program. The compiled program can be associated with processing applications such as image processing, audio processing, and natural language processing applications. The processing can be associated with artificial intelligence applications such as machine learning. The processing unit can include various elements such as compute slices, a control unit, local memory disambiguation units (LMDUs), and a global memory disambiguation unit (GMDU). Each compute slice can independently execute a block of code called a slice task. The slice tasks that can be assigned to the compute slices can be associated with the compiled program. The execution of the slice tasks can be controlled by a local program counter associated with each compute slice. Communication between a compute slice and its immediate neighbors, such as a predecessor compute slice and a successor compute slice, is accomplished using a barrier register set. A current compute slice is not required to write to a predecessor compute slice, nor to read from a successor compute slice.

The ring configuration of compute slices and local memory disambiguation units coupled to a global memory disambiguation unit enables global memory disambiguation for a parallel architecture with compute slices. A processing unit is accessed, comprising a plurality of compute slices, a control unit, a plurality of local memory disambiguation units (LMDUs), and a global memory disambiguation unit (GMDU). Each compute slice within the plurality of compute slices includes at least one execution unit. Each compute slice is coupled to a successor compute slice and a predecessor compute slice. Each compute slice within the plurality of compute slices is coupled to an LMDU in the plurality of LMDUs, and each LMDU in the plurality of LMDUs is coupled to the GMDU. A first compute slice in the plurality of compute slices executes a first slice task. The first slice task includes a load instruction, and the load instruction includes a load address. The first compute slice issues the load instruction to a first LMDU within the first compute slice. The issuing includes saving, in a memory operation table (MOT) within the first LMDU, load information associated with the load instruction. The first LMDU sends the load information to the GMDU, where the load instruction was not fully serviced by the MOT. The sending includes storing, in a global memory operation table (GMOT) within the GMDU, the load information. The GMOT detects address aliasing between the load address and an address of one or more previously issued memory instructions. The address of the one or more previously issued memory instructions is saved in the GMOT. The GMOT forwards, to the MOT, memory information from the one or more previously issued memory instructions. The memory information satisfies one or more bytes of data required for the load instruction.

In the block diagram 400, a ring configuration of compute slices is shown. The compute slices within the ring configuration can include compute slice 1 410, compute slice 2 420, compute slice 3 430, compute slice 4 440, compute slice 5 450, compute slice 6 460, and so on. While six compute slices are shown, the ring of compute slices can also comprise more or fewer compute slices. The compute slice ring configuration can be accomplished using an integrated circuit or chip, a plurality of compute slice cores, a configurable chip such as an FPGA or ASIC, and the like. The ring configuration can be based on a regularized circuit layout, equalized interconnect lengths, and so on. Each compute slice, such as compute slice 3 430, can be coupled to a successor compute, such as compute slice 1 410, and a predecessor compute slice, such as compute slice 5 450. The coupling can include a barrier register set such as a barrier register set described previously. In a usage example, the compute slice 3 430 can only write to the barrier register and compute slice 1 410 can only read from the same barrier register. This architectural technique can ensure that a compute slice that requires input data from a predecessor compute slice can read valid data. That is, the current compute slice generates data, branch decisions, etc., and writes the generated data and branch decision information to the input of the barrier register while the output of the register remains unchanged. The data being read at the output of the barrier register will remain valid while the successor compute slice is processing data. The results from the first compute slice are not committed to the output of the barrier register set until after the current compute slice has completed execution and the successor compute slice has obtained its data. The committing of data to the output of the barrier register set is performed by the control unit. This technique eliminates a race condition such as a write-before-read race condition.

Each of the compute slices can include at least one LMDU from a plurality of LMDUs. A compute slice can execute a first slice task distributed by the control unit to the compute slice. A compute slice can issue a load instruction to a first LMDU, based on the compute slice executing the first slice task. The issuing can include saving load information associated with the load instruction in a memory operation table (MOT) within the LMDU. The load instruction includes a load address. The LMDU can detect address aliasing between the load address and a store address of a previously issued store instruction. The detecting address aliasing can be accomplished using the MOT within the LMDU. In embodiments, the first compute slice can send the load information to the GMDU. The sending the load information to the GMDU can occur if the load instruction was not fully serviced by the MOT. The sending can include storing the load information in a global memory operation table (GMOT) within the GMDU. The GMDU can look across the plurality of LMDUs for address aliasing. The address aliasing can include aliasing between the load address and an address of one or more previously issued memory instructions. When aliasing is detected, the GMOT can forward memory information to the MOT from the one or more previously issued memory instruction. The forwarding can occur when the memory information satisfies one or more bytes of data required for the load instruction.

The MOT can forward store information comprising one or more bytes of data from the previously issued store instruction, where the store information satisfies data required by the load instruction. In the block diagram 400, compute slice 1 410 includes LMDU 1 412, compute slice 2 420 includes LMDU 2 422, compute slice 3 430 includes LMDU 3 432, compute slice 4 440 includes LMDU 4 442, compute slice 5 450 includes LMDU 5 452, and compute slice 6 460 includes LMDU 6 462. While six LSUs are shown, more or fewer LSUs can be present, according to the number of compute slices in the processor unit. Noted above, each LMDU includes a memory operation table (MOT). In the block diagram 400, LMDU 1 includes MOT1 414, LMDU 2 includes MOT2 424, LMDU 3 includes MOT3 434, LMDU 4 includes MOT4 444, LMDU 5 includes MOT5 454, LMDU 6 includes MOT6 464. Each LMDU can be coupled between its corresponding compute slice and the global memory disambiguation unit (GMDU).

Discussed previously, the MOT can forward store information from a previous store instruction. At times, the load information required by the load operation is not entirely satisfied by the by the store information, so the MOT is not able to fully forward the required data for the load instruction. Thus, load data required by the load instruction must be accessed in shared cache, a shared memory system, and so on. In embodiments, the required load data can be located in another LMDU within the plurality of LMDUs. The block diagram 400 includes a global memory disambiguation unit (GMDU) 470. Each LMDU in the plurality of LMDUs is coupled to the GMDU. The GMDU can "look across" the plurality of LMDUs to determine whether required data is available in one of the other LMDUs. In embodiments, the issuing can include sending, by the first LMDU, the load instruction to the GMDU. Load information sent by an LMDU can be stored in the GMOT 472 within the GMDU. The GMDU can examine an address associated with the load instruction and can perform global alias detecting. The global alias detecting can include detecting address aliasing between the load address and an address of one or more previously issued memory instructions. Embodiments can include performing, by the GMDU, global alias checking against the load instruction. The global alias checking can include one or more other LMDUs in the plurality of LMDUs. One of the other LMDUs can include the requested data that is not available in the first LMDU. Further embodiments can include providing, by the GMDU, the load instruction with one or more additional bytes of data required for the load instruction.

Figure 5:
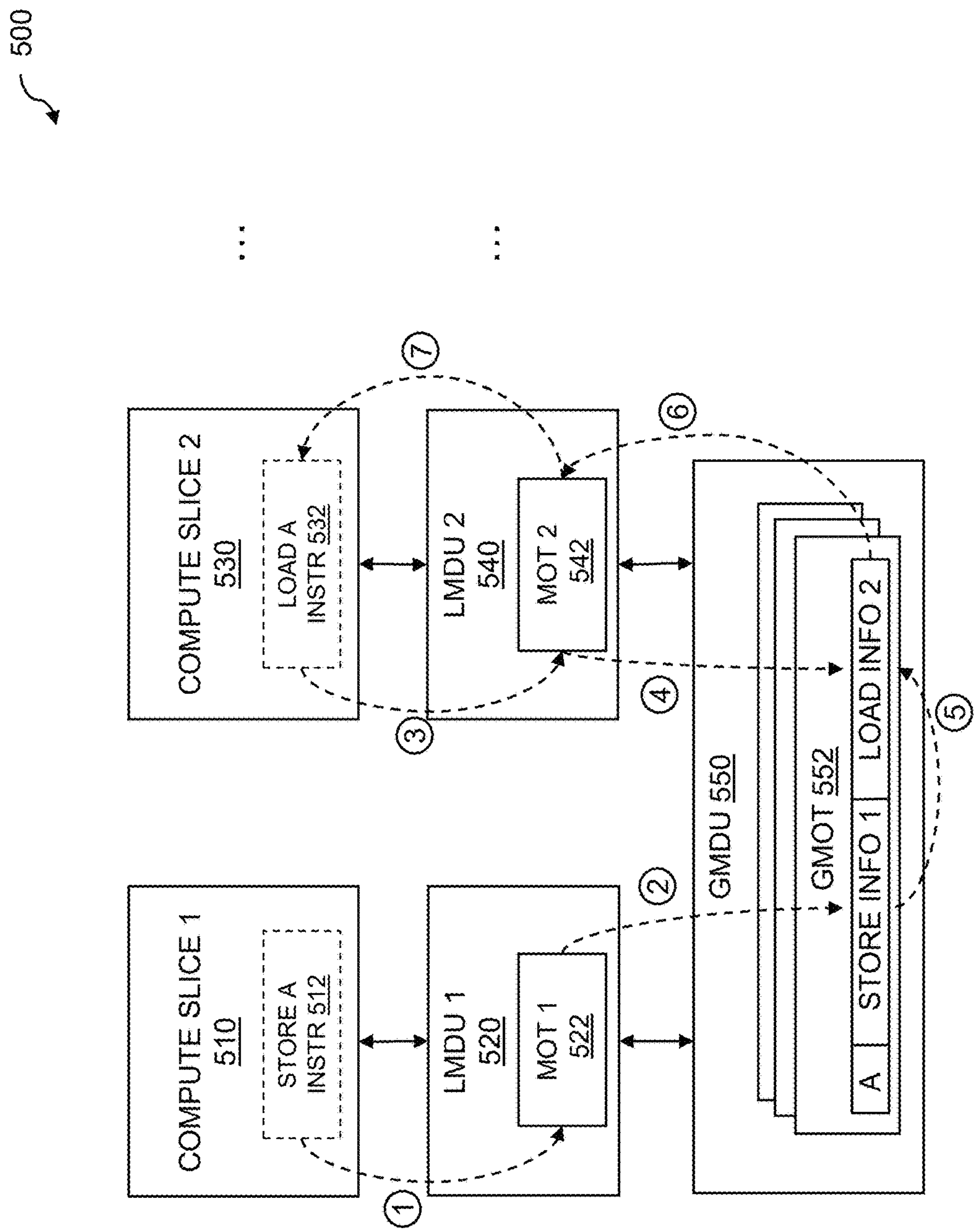
FIG. 5 is a block diagram for MOT and GMOT communication.

FIG. 5 is a block diagram for MOT and GMOT communication. A compute slice executing a slice task can issue a load instruction. The load instruction can request an amount of load data, where the load information may or may not be available locally. Further, only a portion of the load data may be available locally. When local information does not satisfy the load requirements, the LMDU can send the load information to a global memory disambiguation unit (GMDU). The GMDU can look across the plurality of LMDUs to detect address aliasing between the load address associated with the load instruction and an address of previously issued memory instructions. The aliasing can be detected by examining addresses within a global memory operation table (GMOT) within the GMDU. When aliasing is detected, the GMOT can forward memory information to a memory operation table (MOT) within the LMDU that issued the load instruction.

MOT and GMOT communication enables global memory disambiguation for a parallel architecture with compute slices. A processing unit is accessed, comprising a plurality of compute slices, a control unit, a plurality of local memory disambiguation units (LMDUs), and a global memory disambiguation unit (GMDU). Each compute slice within the plurality of compute slices includes at least one execution unit. Each compute slice is coupled to a successor compute slice and a predecessor compute slice. Each compute slice within the plurality of compute slices is coupled to an LMDU in the plurality of LMDUs, and each LMDU in the plurality of LMDUs is coupled to the GMDU. A first compute slice in the plurality of compute slices executes a first slice task. The first slice task includes a load instruction, and the load instruction includes a load address. The first compute slice issues the load instruction to a first LMDU within the first compute slice. The issuing includes saving, in a memory operation table (MOT) within the first LMDU, load information associated with the load instruction. The first LMDU sends the load information to the GMDU, where the load instruction was not fully serviced by the MOT. The sending includes storing, in a global memory operation table (GMOT) within the GMDU, the load information. The GMOT detects address aliasing between the load address and an address of one or more previously issued memory instructions. The address of the one or more previously issued memory instructions is saved in the GMOT. The GMOT forwards, to the MOT, memory information from the one or more previously issued memory instructions. The memory information satisfies one or more bytes of data required for the load instruction.

The block diagram 500 includes a first compute slice, compute slice 1 510. The first compute slice can include a compute slice within a plurality of compute slices associated with a processing unit. The compute slice 1 can execute a first slice task, where the first compute slice can include a memory instruction such as a memory store instruction, a memory load instruction, and so on. The memory instruction that is executed can include a store instruction such as a store A instruction 512. The first compute slice issues (arc 1) the store instruction to a first LMDU within the first compute slice, LMDU 1 520. The issuing can include saving store information associated with the store instruction. In the block diagram 500, the saving is accomplished in a memory operation table (MOT), MOT 1 522, within the first LMDU. The MOT can include memory instruction information such as address information, store information, and load information. Each of the information types can include one or more fields (discussed later). The MOT can include one or more memory instructions such as load and store instructions associated with an address. In the block diagram 500, first LMDU sends the store information (arc 2) to a global memory disambiguation unit (GMDU) 550. The sending can include storing the store information. In the block diagram 500, the storing is accomplished in a global memory operation table (GMOT) 552 within the GMDU. Similar to the MOT, the GMOT can include saved load and store instructions associated with an address.

The block diagram 500 includes a second compute slice, compute slice 2 530. The second compute slice can include a second compute slice within the plurality of compute slices associated with the processing unit. While two compute slices are shown, more than two compute slices can be included in the processor unit. The second compute, compute slice 2, can execute a load instruction such as a load A instruction 532. The second compute slice issues (arc 3) the load instruction to a second LMDU within the second compute slice, LMDU 2 540. The issuing can include saving load information associated with the load instruction. The load information can include a load address, needed data from the address (e.g., one or more bytes of data), and so on. In the block diagram 500, the saving is accomplished in a memory operation table (MOT), MOT 2 542, within the second LMDU. MOT 2 can include memory instruction information such as address information, store information, and load information. Each of the information types can include one or more fields (discussed later). The MOT can include one or more memory instructions such as load and store instructions associated with an address. In embodiments, the saving can include checking, by the MOT, for an aliasing between the load address and a previously executed store instruction, wherein the aliasing is not detected. When aliasing is detected, one or more bytes of data within the MOT can satisfy, partially satisfy, or not satisfy the bytes of data required by the load instruction. In the block diagram 500, the second LMDU sends the load information (arc 4) to GMDU 550. The sending can include storing the load information. In the block diagram 500, the storing is accomplished in the global memory operation table (GMOT) 552 within the GMDU 550. The GMOT can include any number of banks. Each bank can comprise a set in an n-way set associative cache. A bank can be selected based on the address of a memory instruction to be saved. Each bank can be fully associative.

The GMOT within the GMDU can detect address aliasing between memory instructions. In the block diagram 500, the GMOT detects address aliasing (arc 5) between the load address of the load A instruction 532 and an address of one or more previously issued memory instructions. In this example, the previously issued memory instruction includes the store A instruction 512. In embodiments, the address of the one or more previously issued memory instructions can be saved in the GMOT. Recall that the GMDU can look across the plurality of LMDUs within a processor unit to determine whether a previously issued instruction, such as a store instruction, has accessed the address from which the load instruction seeks to load data. In the block diagram 500, the GMOT can forward to the MOT (arc 6) memory information from the one or more previously issued memory instructions. The memory information can include one or more bytes of data required for the load instruction. Data forwarded by the GMOT to the MOT, and any MOT data that satisfies the bytes of data required for the load instruction, can be provided to the load instruction, load A 532 (arc 7). The bytes of data provided by the GMOT, and the MOT, can satisfy the bytes of data required by the load instruction without having to seek data in storage external to the processing unit.

Figure 6:
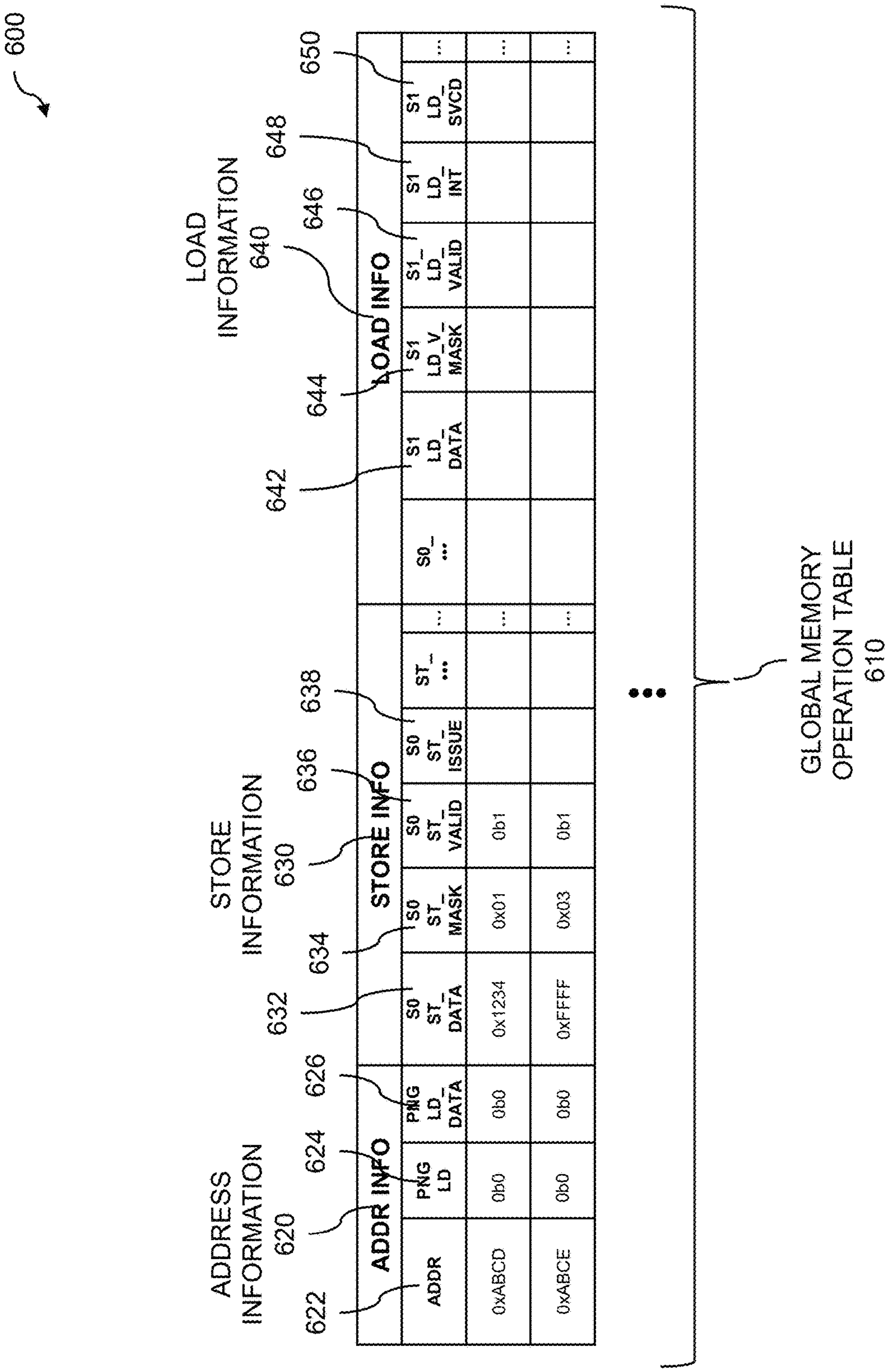
FIG. 6 is an illustration of a global memory operation table (GMOT).

FIG. 6 illustrates a global memory operation table (GMOT). Discussed previously and throughout, an LMDU can send load information to the GMDU when a load instruction is not fully serviced by a MOT associated with the compute slice. Similar to storage of load information in the MOT, the sending by the LMDU to the GMDU includes storing, in a global memory operation table (GMOT) within the GMDU, the load information. Since the GMDU can "look across" the LMDUs for load data required by a load instruction, the GMDU detect and forward memory information from one or more previously issued memory instructions. The GMOT enables global memory disambiguation for a parallel architecture with compute slices. In the illustration 600, a global memory operation table 610 is shown. The GMOT can include three types of information, where the information includes address information, store information, and load information. Each type of information can include one or more fields. The table below shows an example of information types and fields.

TABLE 1

Information types, field names, and field meanings.

| INFO TYPE | FIELD NAME | MEANING |
|---|---|---|
| ADDRESS | ADDR | Address |
| | PNG LD | Pending load |
| | PNG LD_DATA | Pending load data |
| STORE | ST_DATA | Store data |
| | ST_MASK | Store mask |
| | ST_VALID | Store valid |
| | ST_ISSUE | Store issue |
| LOAD | LD_DATA | Load data |
| | LD_V_MASK | Load valid mask |
| | LD_VALID | Load valid |
| | LD_INT | Load interest mask |
| | LD_SVCD | Load serviced |

Each store operation includes address information 620 and store information 630. The address information can include an address 622 such as 0xABDC and 0xABCE. In embodiments, the address can include a 64-bit address. While information is shown for two addresses, other numbers of addresses can be included, where each address is unique. Note that a plurality of store operations and/or load operations can be stored in a row of the GMOT corresponding to the same address. The address information includes a pending load bit 624. The pending load bit can indicate if a load instruction has been issued to storage such as memory. The address information further includes pending load data 626. The pending load data bit can indicate that the load instruction is waiting for load data to be provided or can indicate that the data has been provided. The store information 630 associated with the two store operations includes further fields. The store information fields include store data 632, a store mask bit 634, a store valid bit 636, and a store issue bit 638. The store information includes the store data associated with each store command and comprises a number of bytes. The store mask indicates which one or more bytes of a maximum number of possible bytes will be stored. The number of bytes can include 1, 2, 4, 8, or 16 bytes, and so on. The store valid bit can indicate whether the store data is valid. In this example, each store operation is marked as valid. The store issue bit can indicate whether the store operation has been issued. Issuing the store operation can save the store data to memory. The store issue bit is used to indicate whether the masked store data has been committed to memory such as system memory. In the example, the data associated with either store operation has not been committed to memory.

Each LMDU has a dedicated store and load space within the GMOT. At any point, another store instruction to the same address can be sent by any LMDU within any slice to the GMDU. When this occurs, the new store instruction can be coalesced with existing store instructions that are already saved in the GMOT. Thus, in embodiments, the executing includes a second store instruction, wherein the second store instruction is associated with the load address. Further embodiments include coalescing, in the GMDU, new store information associated with the second store instruction, with the store information.

Eventually, all entries of the GMDU can become full. When the GMDU is full, an LMDU within compute slice that is not the head slice can send a memory instruction to the GMDU. If the memory address does not match an entry already within the GMDU (that is, it cannot be coalesced), back pressure can be applied to the compute slice. The compute slice may stall waiting for an entry to open in the GMDU. If the head slice sends a new memory operation to the GMDU when the GMDU is full, an eviction can occur. In this case, an entire line of the GMOT can be evicted and all LMDUs that have stored memory information at that address are notified.

Load information 640 can also be saved in the GMOT 610. A load instruction can be received from a first compute slice such as compute slice S0, a second compute slice such as compute slice S1, and so on. The load information can be saved with one or more other load instructions that access the same address. If a previous memory operation does not access the load address, then a new entry can be made in the GMOT. The load information can include load data 642 which is initially empty or null before load data is acquired and populates the load data field. The load information can include a load valid mask 644. In embodiments, the load valid mask indicates which data bytes needed by the load instruction have been populated so far and which are still needed. The load information can include a load valid bit 646 which can indicate that the load data is valid and that the load instruction can proceed. The load information can include a load interest field 648. The load interest field can include a mask which can be used to indicate which bytes are "interesting to" or required to satisfy the load instruction. The load interest mask is used to select a number of bytes fewer than the full complement of bytes available in a data field. The load information can include a load serviced bit 650. The load serviced bit can indicate whether the load instruction requires servicing to the LMDU from which the load instruction was sent. In the example GMOT shown, no load instructions have been sent by a LMDU to the GMDU, so the load fields are empty.

FIG. 7 is a first example of forwarding data with a GMOT. In the first example 700, a memory operation table (GMOT) 710 is shown with store information associated with two previously executed store instructions. The two previously executed store instructions have been processed by compute slice S0 and have been sent by an LMDU coupled to slice S0 to the GMDU. The store valid bits 720 are set for both addresses since the store operations have been executed. Note that for each compute slice that sends a store operation, the GMOT includes both a store valid bit and a number of data bytes. In this example, it can be assumed that there are no additional store instructions stored in the GMDU. The store issue bits 722 are shown set to zero which indicates that the store instructions have not yet been sent to memory. A variety of reasons can be associated with the store issue bits being zero. In this example, the store issue bits are set to zero because compute slice S0 is not the current head slice among the plurality of compute slices. Only store operations originating from the head slice can be committed to memory since the head slice is executing non-speculatively, while other compute slices are executing speculatively.

Figure 8:
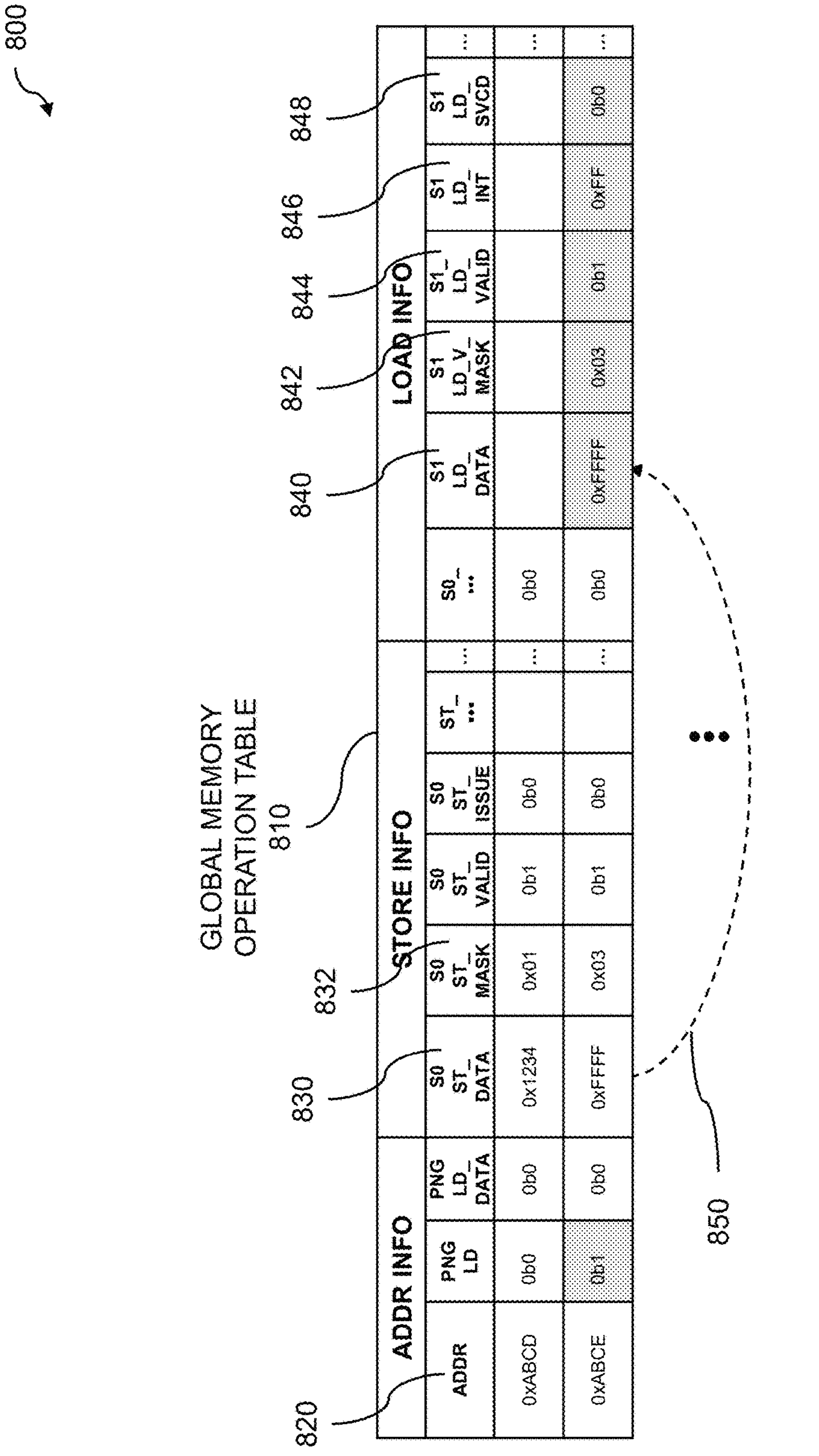
FIG. 8 is a second example of forwarding data with a GMOT.

FIG. 8 is a second example of forwarding data with a GMOT. In the second example 800, a global memory operation table (GMOT) 810 is shown with store information associated with two previously executed store operations as discussed above. A current compute slice, such as compute slice S1, can execute a load operation. In this example, the load operation executed by the compute slice S1 issues the load instruction to a local memory disambiguation unit (LMDU) associated with the compute slice. The compute slice then sends the load information to the global memory disambiguation units (GMDUs). The sending includes saving the load information in the global MOT (GMOT) associated with the GMDU. In the example, the load information includes a load address 820 0xABCE that matches a store address previously saved in the GMOT. The GMDU can then forward 850 load data from the store data 830 to the load data 840. The load valid mask can indicate which data that was forwarded 850 is valid, as indicated by the store valid mask 832. The load interest mask can be updated. The load interest mask 846 can indicate which bytes of memory the load instruction is attempting to load. The load interest mask 846 can be compared to the load valid mask 842 to determine if all of the bytes of data requested by the load instruction are available in the GMOT, or if the GMDU must access memory to fully satisfy the load.

Recall that the address information and the store information associated with previously executed memory operations such as store operations each have one or more information fields. One or more fields can similarly be associated with the load information. The fields associated with the load information are shown in Table 1 above. The load information fields can include load data LD_DATA 840, a load valid mask LD_V_MASK 842, load valid bit LD_VALID 844, a load interest mask LD_INT 846, and a load services LD_SVCD 848 bit. The LD_SVCD bit can indicate whether the load operation has been serviced (e.g., load data returned to) the LMDU that sent the load information to the GMDU. The store mask ST_MASK 832 can be used to indicate which bytes of store data ST_DATA 830 are valid and can be used to satisfy, at least in part, the load instruction. In this case, the ST_MASK 832 is 0x03, indicating that bytes 1 and 3 of ST_DATA 830 are valid. However, since the load mask LD_INT mask, 846, equals 0xFF, we require all data bytes for the load instruction. In embodiments, the required number of data bytes can include eight data bytes. The load has not yet been serviced, so the load serviced bit LD_SVCD 848 is set to 0.

FIG. 9 is a third example of forwarding data with a GMOT. Data requested by a load instruction associated with a slice task executing on a compute slice can be provided from various sources. Discussed previously and throughout, some or all of the data required by the load operation may be available in a memory operation table (MOT) within a local memory disambiguation unit (LMDU) in the compute slice. When the data is not available in the MOT, the load request is sent to the global memory disambiguation unit (GMDU). Some or all of the required data may be available in a global memory operation table (GMOT) within the GMDU. The requested load data may in part or in whole be available from a previously executed memory instruction within the GMDU. When the data is not available in the GMDU, the remaining bytes required to satisfy the load request can be send to memory. One or more cycles can occur during the load memory request. A pending load data PENDING_LD_DATA bit can be set to indicate that a load memory request has been sent to memory.

In the example 900, a global memory operation table (GMOT) 910 is shown with store information associated with two previously executed store operations as presented above. A current compute slice executes a load operation, where the load operation issues the load instruction to the local memory disambiguation unit (LMDU) and saves load information in the MOT within the LMDU. The LMDU sends the load instruction to the global memory disambiguation unit (GMDU) and saves the load information in the global MOT (GMOT). The load operation requests data from an address also associated with one of the store operations. In this example of forwarding data, the load information includes a load address, 0xABCE that matches a store address 920 previously saved in the GMOT. In the example 900, data was forwarded from a previously executed memory instruction to the load instruction to the same address. However, the mask indicates that the load instruction required additional data. In this example, the additional data is obtained from the memory, and the pending load data PNG_LD_DATA 922 bit is set to one.

FIG. 10 is a fourth example of forwarding data with a GMOT. In the example 1000, GMOT 1010 shows that data requested by a load operation has been provided by the memory as described previously. The memory address can be based on the address 1020. The memory address can be associated with a page of memory. The full load data LD_DATA 1030 is 0xA11F, with all bytes by 1 and 3 being supplied from memory. When the data is provided (e.g., returned) by the memory, the pending load data PNG LD_DATA bit 1022 can be cleared by setting the bit to 0b0. Recall that the LOAD_INT was set to 0xFF, indicating that the load instruction required all bytes of data from memory. Now that all bytes have been forwarded to the load entry, the data can now be forwarded by the GMDU to the LMDU associated with the compute slice that executed the load operation. The LMDU can send the data to the compute slice associated with the load operation (discussed below).

FIG. 11 is a fifth example of forwarding data with a GMOT. In embodiments, a load operation can be serviced. The example 1100 shows that GMOT 1110, with memory information that satisfies one or more bytes of data required for the load instruction, can be forwarded by the GMOT to the MOT. The MOT to which the GMOT can forward the data was the MOT that sent the load information to the GMDU. The GMDU provided needed data from one or more other LMDUs or from memory. The address to which the load data is forwarded can include an address such as 0xABCE. When the load data is forwarded from the GMOT to the MOT, the load serviced bit LD_SVCD 1120 can be set to Obl.

FIG. 12 is a sixth example of forwarding data with a GMOT. In the example 1200, GMOT 1210 shows that memory information from one or more previously issued memory instructions, memory, and so on has been forwarded by the GMOT to the MOT. The memory information satisfies one or more bytes of data required by the load instruction that was executed on a compute slice. In this example, since the bytes of data that satisfy the load instruction have been forwarded, the load operation is no longer pending load data. In this example, since the bytes of data that satisfy the load instruction have been forwarded, the load operation is no longer pending load data. All bits that are true in the load interest mask LD_INT are now true in the load valid mask LD_V_MASK, and LD_SVCD is true since the load information has been forwarded. The load data with the row may or may not be reclaimed. In embodiments, the data with the row is not reclaimed unless the load instruction originated from the head compute slice. That is, the compute slice is executing non-speculatively. Recall that other compute slices can be executing slice tasks speculatively. Whether or not the data row can be reclaimed can be determined since the load valid LD_VALID bit for the compute slice that issued the load operation remains set. The check for whether the load operation came from the head slice is necessary in case a previous compute slice sends a store to the same address. In such a case, the load information in the GMOT is resent to the LMDU, and the LMDU determines whether it needs to "kill" the slice because wrong or invalid data was previously sent. In a usage example, a situation can occur where the GMOT re-forwards data before the data was consumed by the compute slice. In such a situation, the slice may be able to continue execution. Then the row can be reclaimed when no loads or stores in the row are valid. In embodiments, a load slot in the row of the GMOT can be reclaimed (set to not valid) when a load is not pending issue, load data is not pending, the load has been serviced, and the load was from the head slice.

In embodiments, the storing can include evicting a row from the GMOT. Such an eviction can occur when the GMOT is full. That is, every available position within the GMOT has an address associated with it. The GMOT can evict an entry within the GMOT when a new memory address is sent to the GMOT and the new memory address came from a task slice executing on the head slice. Not all entries within the GMOT can be evicted. In embodiments, the row of the GMOT that was evicted can be associated with one or more successor compute slices. The row can be evicted because the successor compute slices are executed speculatively. Conversely, in embodiments, a row that can be evicted is not associated with the head slice. A condition can occur in which all rows are associated with the head slice. In this case, the head slice can stall until one or more of its loads or stores finish, causing those rows to no longer be associated with the head slice. They can then be evicted.

Figure 13:
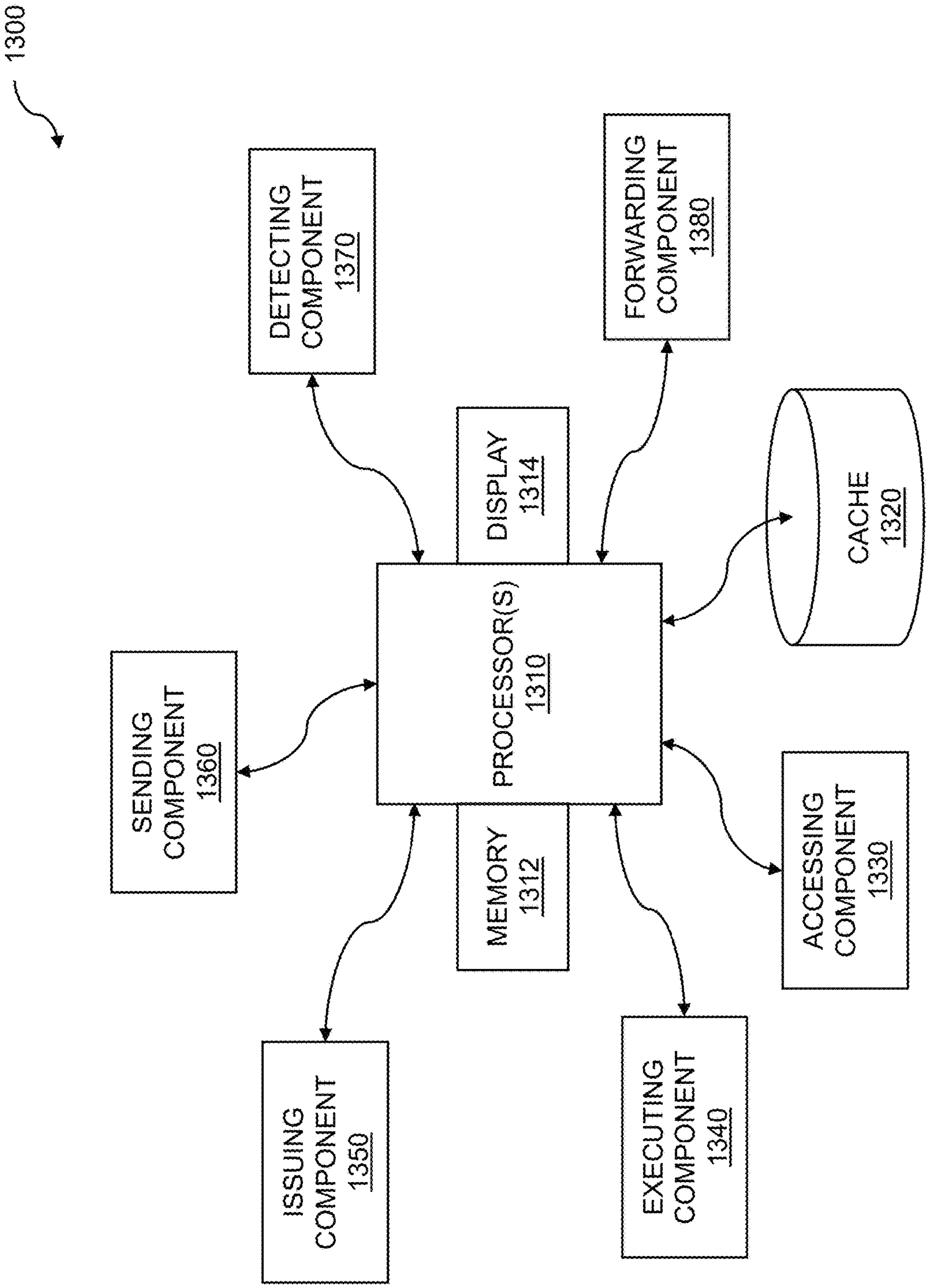
FIG. 13 is a system diagram for global memory disambiguation for a parallel architecture with compute slices.

FIG. 13 is a system diagram for global memory disambiguation for a parallel architecture with compute slices. The system 1300 can include one or more processors 1310, which are coupled to a memory 1312 which stores instructions. The system 1300 can further include a display 1314 coupled to the one or more processors 1310 for displaying data; intermediate steps; slice tasks; topologies including systolic, vector, cyclic, spatial, streaming, or VLIW topologies; and so on. In embodiments, one or more processors 1310 are coupled to the memory 1312, wherein the one or more processors, when executing the instructions which are stored, are configured to: access a processing unit comprising a plurality of compute slices, a control unit, a plurality of local memory disambiguation units (LMDUs), and a global memory disambiguation unit (GMDU), wherein each compute slice within the plurality of compute slices includes at least one execution unit and is coupled to a successor compute slice and a predecessor compute slice, wherein each compute slice within the plurality of compute slices is coupled to an LMDU in the plurality of LMDUs, and wherein each LMDU in the plurality of LMDUs is coupled to the GMDU; execute, by a first compute slice in the plurality of compute slices, a first slice task, wherein the first slice task includes a load instruction, and wherein the load instruction includes a load address; issue, by the first compute slice, the load instruction to a first LMDU within the first compute slice, wherein the issuing includes saving, in a memory operation table (MOT) within the first LMDU, load information associated with the load instruction; send, by the first LMDU, the load information to the GMDU, wherein the load instruction was not fully serviced by the MOT, wherein the sending includes storing, in a global memory operation table (GMOT) within the GMDU, the load information; detect, by the GMOT, address aliasing between the load address and an address of one or more previously issued memory instructions, wherein the address of the one or more previously issued memory instructions is saved in the GMOT; and forward, by the GMOT, to the MOT, memory information from the one or more previously issued memory instructions, wherein the memory information satisfies one or more bytes of data required for the load instruction. The compute slices can include compute slices within one or more integrated circuits or chips; compute slices or cores configured within one or more programmable chips such as application specific integrated circuits (ASICs); field programmable gate arrays (FPGAs); heterogeneous processors configured as a mesh; standalone processors; etc.

The system 1300 can include a cache 1320. The cache 1320 can be used to store data such as scratchpad data, slice tasks for compute slices, memory operation tables, intermediate results, microcode, branch decisions, and so on. The cache can comprise a small, local, easily accessible memory available to one or more compute slices. In embodiments, the data that is stored can include operations, data, and so on. The system 1300 can include an accessing component 1330. The accessing component 1330 can include control logic and functions for accessing a processing unit. The processing unit can be accessible within an integrated circuit, an application-specific integrated circuit (ASIC), a programmable unit such as a field-programmable gate array (FPGA), and so on. The processing unit can comprise a plurality of compute slices, a control unit, a plurality of local memory disambiguation units (LMDUs), and a memory system.

Each compute slice within the plurality of compute slices includes at least one execution unit. A compute slice can include one or more processors, processor cores, processor macros, processor cells, and so on. Each compute slice can include an amount of local storage. The local storage may be accessible by one or more compute slices. The compute slices can be organized in a ring. Compute slices within the ring can be accessed using pointers. The pointers can include a head pointer, a tail pointer, and the like. Each compute slice is coupled to a successor compute slice and a predecessor compute slice by a barrier register set in the plurality of barrier register sets. The barrier register set provides for communication of data between successive compute slices. Communication between and among compute slices can be accomplished using a bus such as an industry standard bus, a ring bus, a network such as a wired or wireless computer network, etc. In embodiments, the ring bus is implemented as a distributed multiplexor (MUX). Each compute slice within the plurality of compute slices is coupled to a local memory disambiguation unit (LMDU) in the plurality of LMDUs. Discussed below, the LMDUs can hold one or more store instructions, one or more load instructions, and so on. Each LMDU in the plurality of LMDUs is coupled to a global memory disambiguation unit (GMDU). The GMDU can access a memory system. Discussed below, the GMDU can "look across" the plurality of LMDUs for address aliasing associated with store instructions and load instructions.

A compiled program can comprise a plurality of compute tasks. The compute tasks can be distributed to one or more compute slices within the plurality of compute slices. The distributed compute tasks can include slice tasks. The distributing can be accomplished using pointers. The pointers can be initialized to indicate a first compute slice, a second compute slice, and so on. Embodiments can further include initializing pointers. A head pointer points to the first compute slice, and a tail pointer points to the second compute slice. The slice task can include a task that is running speculatively or running non-speculatively. In embodiments, the head pointer points to a slice task that is running non-speculatively. The first slice task includes a load instruction. The distributing can be accomplished using a bus, a network such as a network-on-chip (NOC), and so on. The distributing is accomplished by the control unit. The distributing the first slice task for the first compute slice can be accomplished when the first compute slice is the head slice. The head slice can be a state within the control unit and can point to the first compute slice running a slice task non-speculatively.

The system 1300 can include an executing component 1340. The executing component 1340 can include control and functions for executing, by a first compute slice in the plurality of compute slices, a first slice task. The first slice task includes a load instruction, and the load instruction includes a load address. The load instruction can initiate a memory access operation. The memory access operation can be handled by the LMDU, by the GMDU, and so on. In embodiments, the executing can include a second load instruction, wherein the second load instruction includes the load address. The second load instruction can be accepted or rejected for execution. Further embodiments can include rejecting, by the LMDU, the load instruction. The load instruction can be rejected for a variety of reasons such as the store data to which the load instruction refers not yet having been committed to memory. In other embodiments, the executing can include a second store instruction, wherein the second store instruction is associated with the load address. Storing data to an address required by a load instruction can create a race condition or memory access hazard. Further embodiments can include coalescing, in the LMDU, new store information associated with the second store instruction with the store information.

The system 1300 can include an issuing component 1350. The issuing component 1350 can include control and functions for issuing, by the first compute slice, the load instruction to the first LMDU. The issuing includes saving, in a memory operation table (MOT) within the LMDU, load information associated with the load instruction. Discussed previously and throughout, the MOT can include various types of information such as address information, store information, loading information, and so on. A row within the MOT can include one or more of a store operation, a load operation, and so on. The issuing can add a row to the MOT, where the row includes address information and load information associated with the load instruction. If the address accessed by the load instruction has an assigned row due to a previously executed load or store operation, then the load instruction load information is added to or coalesced with an existing row.

The system 1300 can include a sending component 1360. The sending component 1360 can include control and functions for sending, by the first LMDU, the load information to the GMDU, wherein the load instruction was not fully serviced by the MOT. The sending includes storing, in a global memory operation table (GMOT) within the GMDU, the load information. The GMOT can include information associated with the load instruction such as the load address, load data required to satisfy the load instruction, mask information, and so on. The GMOT can further include information associated with one or more memory instructions including other load instructions, store instructions, and the like. The GMOT can include information associated with previously issued memory instructions, as discussed below.

The system 1300 can include a detecting component 1370. The detecting component 1370 can include control and functions for detecting, by the GMOT, address aliasing between the load address and an address of one or more previously issued memory instructions. The address of the one or more previously issued memory instructions is saved in the GMOT. The detecting can be used to determine whether some or all of the previously issued memory instruction data in the GMOT matches data requested by the load operation. A load valid mask (discussed previously) can be used to indicate an amount of data such as how many bytes of data are required by the load instruction. For situations in which data bytes requested by the load instruction are not available from one or more previously issued memory instructions, the load instruction can obtain further data from a memory such as a system memory, shared memory, and so on. The GMDU can look across the other LMDUs to determine whether the required data is available and valid.

The system 1300 can include a forwarding component 1380. The forwarding component 1380 can include control and functions for forwarding, by the GMOT, to the MOT, memory information from the one or more previously issued memory instructions, wherein the memory information satisfies one or more bytes of data required for the load instruction. When the forwarded bytes do not fully satisfy the load data requirements, the remaining bytes can be obtained from the GMDU. Discussed above, the one or more bytes of data associated with one or more previously issued memory instructions can include some or all of the bytes of data required by the load instruction. When the data is not available in the LMDU, the data can be sought in the GMDU. The one or more bytes associated with the one or more previously issued memory instructions can be obtained from one or more LMDUs associated with one or more additional compute slices. The GMDU can poll other LMDUs for the requested load data. If the requested load data is not found within the GMOT, then storage can be accessed to accomplish the forwarding. In embodiments, the forwarding can include requesting from memory, by the GMOT, one or more additional bytes of data required for the load instruction.

The system 1300 can include a computer program product embodied in a non-transitory computer readable medium for checking memory operations, the computer program product comprising code which causes one or more processors to generate semiconductor logic for: accessing a processing unit comprising a plurality of compute slices, a control unit, a plurality of local memory disambiguation units (LMDUs), and a global memory disambiguation unit (GMDU), wherein each compute slice within the plurality of compute slices includes at least one execution unit and is coupled to a successor compute slice and a predecessor compute slice, wherein each compute slice within the plurality of compute slices is coupled to an LMDU in the plurality of LMDUs, and wherein each LMDU in the plurality of LMDUs is coupled to the GMDU; executing, by a first compute slice in the plurality of compute slices, a first slice task, wherein the first slice task includes a load instruction, and wherein the load instruction includes a load address; issuing, by the first compute slice, the load instruction to a first LMDU within the first compute slice, wherein the issuing includes saving, in a memory operation table (MOT) within the first LMDU, load information associated with the load instruction; sending, by the first LMDU, the load information to the GMDU, wherein the load instruction was not fully serviced by the MOT, wherein the sending includes storing, in a global memory operation table (GMOT) within the GMDU, the load information; detecting, by the GMOT, address aliasing between the load address and an address of one or more previously issued memory instructions, wherein the address of the one or more previously issued memory instructions is saved in the GMOT; and forwarding, by the GMOT, to the MOT, memory information from the one or more previously issued memory instructions, wherein the memory information satisfies one or more bytes of data required for the load instruction.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagram and flow diagram illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions generally referred to herein as a "circuit," "module," or "system" may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for checking memory operations comprising:

accessing a processing unit comprising a plurality of compute slices, a control unit, a plurality of local memory disambiguation units (LMDUs), and a global memory disambiguation unit (GMDU), wherein each compute slice within the plurality of compute slices includes at least one execution unit and is coupled to a successor compute slice and a predecessor compute slice, wherein each compute slice within the plurality of compute slices is coupled to an LMDU in the plurality of LMDUs, and wherein each LMDU in the plurality of LMDUs is coupled to the GMDU;

executing, by a first compute slice in the plurality of compute slices, a first slice task, wherein the first slice task includes a load instruction, and wherein the load instruction includes a load address;

issuing, by the first compute slice, the load instruction to a first LMDU within the first compute slice, wherein the issuing includes saving, in a memory operation table (MOT) within the first LMDU, load information associated with the load instruction;

sending, by the first LMDU, the load information to the GMDU, wherein the load instruction was not fully serviced by the MOT, wherein the sending includes storing, in a global memory operation table (GMOT) within the GMDU, the load information;

detecting, by the GMOT, address aliasing between the load address and an address of one or more previously issued memory instructions, wherein the address of the one or more previously issued memory instructions is saved in the GMOT; and forwarding, by the GMOT, to the MOT, memory information from the one or more previously issued memory instructions, wherein the memory information satisfies one or more bytes of data required for the load instruction.

2. The method of claim 1 wherein the saving includes checking, by the MOT, for an aliasing between the load address and a previously executed store instruction, wherein the aliasing is not detected.

3. The method of claim 1 further comprising coalescing, within the GMOT, one or more additional store instructions, wherein the one or more additional store instructions include a same store address, wherein the one or more additional store instructions are obtained from the first LMDU.

4. The method of claim 1 wherein the forwarding includes requesting from memory, by the GMOT, one or more additional bytes of data required for the load instruction.

5. The method of claim 1 further comprising transmitting, by the MOT, to the first compute slice, the one or more bytes of data required for the load instruction.

6. The method of claim 5 further comprising reclaiming a load space within the GMOT, wherein the load space was associated with the one or more bytes of data required for the load instruction, and wherein a compute slice associated with the load space is a head slice.

7. The method of claim 1 wherein the one or more previously issued memory instructions comprise one or more previously executed store instructions.

8. The method of claim 7 further comprising updating a memory, by the GMOT, wherein the compute slice is a head slice.

9. The method of claim 1 further comprising identifying an additional store instruction to the load address, wherein the additional store instruction was issued by a predecessor compute slice, and wherein the additional store instruction was issued after the forwarding.

10. The method of claim 9 further comprising comparing, by the GMOT, a store mask associated with the additional store instruction to a load mask associated with the load instruction, wherein at least one bit of the store mask matches the load mask.

11. The method of claim 10 wherein data associated with the at least one bit is not identical between load data associated with the load instruction and store data associated with the additional store instruction.

12. The method of claim 11 further comprising cancelling the first slice task, by the first LMDU, wherein the MOT has already sent, to the first compute slice, the one or more bytes of data required for the load instruction.

13. The method of claim 1 wherein the previously issued memory instruction is a previously executed load instruction.

14. The method of claim 1 wherein the storing includes evicting a row of the GMOT, wherein the GMOT is full.

15. The method of claim 14 wherein the first compute slice is a head slice.

16. The method of claim 14 wherein the row of the GMOT that was evicted is associated with one or more successor compute slices, wherein the row of the GMOT is not associated with a head slice.

17. The method of claim 1 further comprising arbitrating, between the first LMDU and one or more LMDUs in the plurality of LMDUs, for access to the GMDU.

18. The method of claim 1 further comprising distributing, by the control unit, the first slice task to the first compute slice.

19. The method of claim 18 wherein the distributing includes allotting a second slice task to a second compute slice within the plurality of compute slices.

20. The method of claim 19 further comprising initializing pointers, wherein a head pointer points to the first compute slice, and wherein a tail pointer points to the second compute slice.

21. The method of claim 20 wherein the head pointer points to a slice task that is running non-speculatively.

22. The method of claim 1 wherein the detecting, by the GMOT, address aliasing between the load address and an address of one or more previously issued memory instructions is selectively overridden, based on exclusion of any false negative aliases.

23. A computer system for checking memory operations comprising:

a memory which stores instructions;

one or more processors coupled to the memory, wherein the one or more processors, when executing the instructions which are stored, are configured to:

access a processing unit comprising a plurality of compute slices, a control unit, a plurality of local memory disambiguation units (LMDUs), and a global memory disambiguation unit (GMDU), wherein each compute slice within the plurality of compute slices includes at least one execution unit and is coupled to a successor compute slice and a predecessor compute slice, wherein each compute slice within the plurality of compute slices is coupled to an LMDU in the plurality of LMDUs, and wherein each LMDU in the plurality of LMDUs is coupled to the GMDU;

execute, by a first compute slice in the plurality of compute slices, a first slice task, wherein the first slice task includes a load instruction, and wherein the load instruction includes a load address;

issue, by the first compute slice, the load instruction to a first LMDU within the first compute slice, wherein the issuing includes saving, in a memory operation table (MOT) within the first LMDU, load information associated with the load instruction;

send, by the first LMDU, the load information to the GMDU, wherein the load instruction was not fully serviced by the MOT, wherein the sending includes storing, in a global memory operation table (GMOT) within the GMDU, the load information;

detect, by the GMOT, address aliasing between the load address and an address of one or more previously issued memory instructions, wherein the address of the one or more previously issued memory instructions is saved in the GMOT; and forward, by the GMOT, to the MOT, memory information from the one or more previously issued memory instructions, wherein the memory information satisfies one or more bytes of data required for the load instruction.

24. A computer program product embodied in a non-transitory computer readable medium for checking memory operations, the computer program product comprising code which causes one or more processors to generate semiconductor logic for:

accessing a processing unit comprising a plurality of compute slices, a control unit, a plurality of local memory disambiguation units (LMDUs), and a global memory disambiguation unit (GMDU), wherein each compute slice within the plurality of compute slices includes at least one execution unit and is coupled to a successor compute slice and a predecessor compute slice, wherein each compute slice within the plurality of compute slices is coupled to an LMDU in the plurality of LMDUs, and wherein each LMDU in the plurality of LMDUs is coupled to the GMDU;

executing, by a first compute slice in the plurality of compute slices, a first slice task, wherein the first slice task includes a load instruction, and wherein the load instruction includes a load address;

issuing, by the first compute slice, the load instruction to a first LMDU within the first compute slice, wherein the issuing includes saving, in a memory operation table (MOT) within the first LMDU, load information associated with the load instruction;

sending, by the first LMDU, the load information to the GMDU, wherein the load instruction was not fully serviced by the MOT, wherein the sending includes storing, in a global memory operation table (GMOT) within the GMDU, the load information;

detecting, by the GMOT, address aliasing between the load address and an address of one or more previously issued memory instructions, wherein the address of the one or more previously issued memory instructions is saved in the GMOT; and forwarding, by the GMOT, to the MOT, memory information from the one or more previously issued memory instructions, wherein the memory information satisfies one or more bytes of data required for the load instruction.

* * * * *